US012767834B2

(12) United States Patent
Li et al.

(10) Patent No.: US 12,767,834 B2
(45) Date of Patent: Oct. 20, 2026

(54) AQUEOUS COATING COMPOSITION AND METHOD OF PREPARING THEREOF

(71) Applicant: Dow Global Technologies LLC, Midland, MI (US)

(72) Inventors: Hu Li, Shanghai (CN); Jia Tang, Shanghai (CN); Baoqing Zheng, Shanghai (CN); Yan Wu, Shanghai (CN)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 369 days.

(21) Appl. No.: 18/571,416

(22) PCT Filed: Sep. 22, 2021

(86) PCT No.: PCT/CN2021/119683

§ 371 (c)(1),
(2) Date: Dec. 18, 2023

(87) PCT Pub. No.: WO2023/044613

PCT Pub. Date: Mar. 30, 2023

(65) Prior Publication Data

US 2024/0287317 A1 Aug. 29, 2024

(51) Int. Cl.

| | |
|---|---|
| ***C09D 5/02*** | (2006.01) |
| ***C08K 5/092*** | (2006.01) |
| ***C09D 5/08*** | (2006.01) |
| ***C09D 125/14*** | (2006.01) |

(52) U.S. Cl.

CPC ............... *C09D 5/022* (2013.01); *C09D 5/08* (2013.01); *C09D 125/14* (2013.01); *C08K 5/092* (2013.01)

(58) Field of Classification Search

CPC ........................................................ C09D 5/08

See application file for complete search history.

(56) References Cited

U.S. PATENT DOCUMENTS

| | | | | |
|---|---|---|---|---|
| 4,354,881 | A | 10/1982 | Tanikawa et al. | |
| 2007/0001150 | A1 | 1/2007 | Hudgens et al. | |
| 2011/0177352 | A1 * | 7/2011 | Ambrose ............ | C09D 125/14 523/105 |
| 2015/0053111 | A1 | 2/2015 | Minch et al. | |

FOREIGN PATENT DOCUMENTS

| | | | | |
|---|---|---|---|---|
| CN | 103834249 | | 6/2016 | |
| CN | 107488494 | | 12/2017 | |
| EP | 176504 | | 3/1989 | |
| GB | 2048262 | | 12/1980 | |
| JP | 2006045643 | | 2/2006 | |
| JP | 2012188481 | A * | 10/2012 | |
| WO | 1995034694 | | 12/1995 | |
| WO | WO-2020129425 | A1 * | 6/2020 | ............. C23F 11/00 |

OTHER PUBLICATIONS

Machine translation of WO-2020129425-A1 (Year: 2020).*
Machine translation of JP-2012188481-A (Year: 2012).*
Brandrup, "Polymer Handbook", Interscience Publishers.
Fox, Bull. Am. Physics Soc., 1956, vol. 1, No. 3, p. 123.

* cited by examiner

*Primary Examiner* — Wenwen Cai

(74) *Attorney, Agent, or Firm* — CANTOR COLBURN LLP

(57) ABSTRACT

An aqueous coating composition contains: (A) an emulsion polymer comprising, based on the weight of the emulsion polymer, from 0.48 wt % to 1.20 wt % of structural units of a phosphorous acid monomer, a salt thereof, or mixtures thereof, from 0.5 wt % to 3 wt % of structural units of diacetone (meth) acrylamide, from 10 wt % to 80 wt % of structural units of a vinyl aromatic monomer, structural units of a $C_1$-$C_{24}$-alkyl ester of (meth) acrylic acids, and optionally, structural units of an α, β-ethylenically unsaturated carboxylic acid; (B) a specific amount of a dicarboxylic acid of formula (I) HOOC—R—COOH, a salt thereof, or mixtures thereof; and (C) from 0.05 wt % to 5 wt % of a flash rust inhibitor relative to the aqueous coating composition weight.

14 Claims, No Drawings

AQUEOUS COATING COMPOSITION AND METHOD OF PREPARING THEREOF

FIELD

The present invention relates to an aqueous polymer composition and a method of preparing the same.

INTRODUCTION

Solvent borne coating compositions comprising epoxy resins, polyurethane, or alkyd resins are widely used in metal protective coatings due to their anti-corrosion performance, mechanical properties and appearance. Waterborne acrylic polymer dispersions have much less environmental concerns than solvent borne dispersions and are usually used for light to medium duty metal protection. Ferrous metals such as carbon steel, cast iron, and metal parts with weld seams are prone to rapid corrosion, known as "flash rusting". Shortly or instantly after conventional waterborne coating compositions are applied to such metal surface and before the resulting coating films thoroughly dry, flash rust tends to form as discrete rust spots visible to the naked eye. It is more challenging for waterborne coating compositions to be used in high temperature (e.g., 40° C. or higher) or high humidity (e.g., 90% relative humidity or higher) environments due to flash rust formation.

Early water resistance and long-term corrosion resistance are also key properties for metal protective coatings. Different from flash rusting, long-term corrosion refers to the corrosion of metal substrates that occurs after coating films thoroughly dry. Long-term corrosion resistance is typically evaluated by salt spray testing. Addition of sufficient amounts of flash rust inhibitors such as sodium nitrite into waterborne coating compositions may reduce or eliminate the formation of flash rust, but typically hurts early water resistance and/or long-term corrosion resistance. It is challenging for waterborne compositions to afford good flash rust resistance while achieving desirable early water resistance and long-term corrosion resistance.

Therefore, there remains a need to provide an aqueous coating composition with the above-described balanced properties including flash rust resistance, long-term corrosion resistance and early water resistance.

SUMMARY

The present invention provides a novel aqueous coating composition without the aforementioned problems. The aqueous coating composition comprises a novel combination of a specific emulsion polymer and a specific dicarboxylic acid, a salt thereof, or mixtures thereof. The aqueous coating composition can provide excellent flash rust resistance with rating of "0" even under high temperature and high humidity conditions (e.g., 40° C. and 90% relative humidity); good long-term corrosion resistance characterized by blister ratings of at least "6F" or "M" and rust ratings of at least "9P" or "9S", after 150 hours of exposure to salt spray test; and good early water resistance rated as blister ratings of at least "8M"; and rust ratings of at least "9P" or "9S". These properties can be measured according to the test methods described in the Examples section below.

In a first aspect, the present invention is an aqueous coating composition comprising:

(A) an emulsion polymer comprising, based on the weight of the emulsion polymer, from 0.48% to 1.20% by weight of structural units of a phosphorous acid monomer, a salt thereof, or mixtures thereof, from 0.5% to 3% by weight of structural units of diacetone (meth)acrylamide, from 10% to 80% by weight of structural units of a vinyl aromatic monomer, structural units of a $C_1$-$C_{24}$-alkyl ester of (meth)acrylic acids, and optionally, structural units of an α, β-ethylenically unsaturated carboxylic acid, a salt thereof, or mixtures thereof;

(B) a dicarboxylic acid, a salt thereof, or mixtures thereof; wherein the dicarboxylic acid has the structure of formula (I):

$$HOOC—R—COOH \quad (I)$$

where R is alkylene, alkenylene, alkynylene, cycloalkylene, cycloalkenylene, cycloalkynylene, arylene, or heterocyclic arylene; containing 6 to 18 carbon atoms;

wherein the dicarboxylic acid, the salt thereof, or mixtures thereof are present in an amount to provide —OOC—R—COO— segments at a concentration of from 0.28% to 1.0% by weight, based on the weight of the aqueous coating composition; and (C) from 0.05% to 5% by weight of a flash rust inhibitor, based on the weight of the aqueous coating composition.

In a second aspect, the present invention is a method preparing the aqueous coating composition of the first aspect, comprising admixing the emulsion polymer, and the dicarboxylic acid, the salt thereof, or mixtures thereof, with the flash rush inhibitor.

DETAILED DESCRIPTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International methods, ISO refers to International Organization for Standards, and GB/T refers to China National Standard.

Products identified by their tradename refer to the compositions available under those tradenames on the priority date of this document. "And/or" means "and, or as an alternative". All ranges include endpoints unless otherwise indicated.

"Aqueous" composition or dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, or mixtures thereof.

The word fragment "(meth)acryl" refers to both "methacryl" and "acryl". For example, (meth)acrylic acid refers to both methacrylic acid and acrylic acid, and methyl (meth) acrylate refers to both methyl methacrylate and methyl acrylate.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

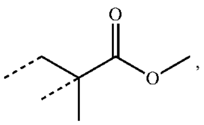

where the dotted lines represent the points of attachment of the structural unit to the polymer backbone.

"Alkylene" means a branched or unbranched, saturated divalent hydrocarbon group. Exemplary alkylene groups include methylene ($—CH_2—$), ethylene ($—CH_2CH—$), $—CH_2CH(CH_3)CH_2—$, or combinations thereof. "Cycloalkylene" means a branched or unbranched, divalent hydrocarbon group connecting with one or more cycloalkyl group. Exemplary cycloalkylene groups include cyclohexylene, methylcyclohexylene, or combinations thereof. "Alkenylene" means a branched or unbranched, bivalent hydrocarbon group having one or more carbon-carbon double bonds. Exemplary alkenylene groups include ethenylene ($—CH{=}CH—$), $—CH{=}CH—CH_2—$, $—CH{=}C(CH_3)—$, or combinations thereof "Cycloalkenylene" means a branched or unbranched, bivalent hydrocarbon group having one or more carbon-carbon double bond connecting or within one or more cycloalkyl group. Exemplary cycloalkenylene groups include cyclohexenylene, $—CH{=}CH—C_6H_{10}—$, or combinations thereof. "Alkynylene" means a branched or unbranched, bivalent hydrocarbon group having one or more carbon-carbon triple bond. Exemplary alkynylene groups include ethynylene, $—C{\equiv}C—$, $—C{\equiv}C—CH_2—$, or combinations thereof. "Cycloalkynylene" means a branched or unbranched, bivalent hydrocarbon group having one or more carbon-carbon triple bond connecting or within one or more cycloalkyl group. Exemplary cycloalkynylene groups include $—C{\equiv}C—C_6H_{10}—$, or combinations thereof. "Arylene" means a branched or unbranched, bivalent hydrocarbon group connecting with one or more aryl group. Exemplary arylene groups include phenylene, $—C_6H_4—$, $—CH_2—C_6H_4—$, $—CH_2—C_6H_3(CH_3)—$, or combinations thereof. "Heterocyclic arylene" means a branched or unbranched, bivalent hydrocarbon group connecting with one or more heterocyclic aryl group. Exemplary heterocyclic arylene groups include pyridylene, thiazylene, or combinations thereof.

"Glass transition temperature" or "$T_g$" as used herein can be calculated by using a Fox equation (T. G. Fox, Bull. Am. Physics Soc., Volume 1, Issue No. 3, page 123 (1956)) below. For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$, all temperatures being in K. The glass transition temperatures of the homopolymers may be found, for example, in "Polymer Handbook", edited by J. Brandrup and E. H. Immergut, Interscience Publishers.

"Weight of the emulsion polymer" refers to the dry weight of the emulsion polymer.

The aqueous coating composition of the present invention comprises one or more emulsion polymer, typically in an aqueous dispersion. The emulsion polymer may comprise structural units of one or more phosphorous acid monomer, a salt thereof, or mixtures thereof. Phosphorous acid monomers may have an ethylenically unsaturation. The phosphorous acid monomers can be dihydrogen phosphate esters of an alcohol in which the alcohol contains or is substituted with a polymerizable vinyl or olefinic group. The phosphorous acid monomers and salts thereof may include phosphoalkyl (meth)acrylates such as phosphoethyl (meth)acrylate, phosphopropyl (meth)acrylate, phosphobutyl (meth)acrylate, salts thereof, and mixtures thereof; $CH_2{=}C(R_{p1})—C(O)—O—(R_{p2}O)_q—P(O)(OH)_2$, wherein $R_{p1}{=}H$ or $CH_3$, $R_{p2}$=alkylene, such as an ethylene group, a propylene group, or a combination thereof; and q=1-20, such as SIPOMER PAM-100, SIPOMER PAM-200, SIPOMER PAM-300 and SIPOMER PAM-600 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, or mixtures thereof. Desirably, the phosphorus acid monomer is selected from phosphoethyl methacrylate (PEM), phosphoethyl acrylate, allyl ether phosphate, phosphopropyl methacrylate, phosphobutyl methacrylate, or mixtures thereof, and more preferably, phosphoethyl methacrylate. The emulsion polymer may comprise structural units of the phosphorous acid monomer, salt thereof, or mixtures thereof at a concentration of 0.48% or more, and can be 0.50% or more, 0.52% or more, 0.55% or more, 0.58% or more, 0.60% or more, 0.62% or more, 0.65% or more, 0.68% or more, 0.70% or more, 0.72% or more, 0.75% or more, 0.78% or more, 0.80% or more, 0.82% or more, 0.85% or more, 0.88% or more, or even 0.90% or more, while at the same time is generally 1.20% or less, and can be 1.19% or less, 1.18% or less, 1.17% or less, 1.16% or less, 1.15% or less, 1.12% or less, 1.10% or less, 1.08% or less, 1.05% or less, 1.02% or less, 1.00% or less, 0.98% or less, 0.95% or less, or even 0.92% or less, by weight based on the weight of the emulsion polymer.

The emulsion polymer useful in the present invention may comprise structural units of diacetone (meth)acrylamide, and preferably, diacetone acrylamide (DAAM). The emulsion polymer may comprise structural units of the diacetone (meth)acrylamide at a concentration of from 0.5% to 3%, and can be 0.5% or more, 0.6% or more, 0.7% or more, 0.8% or more, 0.9% or more, 1.0% or more, 1.1% or more, 1.2% or more, 1.3% or more, 1.4% or more, 1.5% or more, 1.6% or more, 1.7% or more, or even 1.75% or more, while at the same time is generally at a concentration of 3% or less, and can be 3% or less, 2.9% or less, 2.8% or less, 2.7% or less, 2.6% or less, 2.5% or less, 2.45% or less, 2.3% or less, 2.2% or less, 2.1% or less, 2.0% or less, 1.9% or less, 1.8% or less, or even 1.75% or less, by weight based on the weight of the emulsion polymer, The emulsion polymer useful in the present invention may comprise structural units of one or more α, β-ethylenically unsaturated carboxylic acid, a salt thereof, or mixtures thereof. Suitable a, β-ethylenically unsaturated carboxylic acids may include, for example, acrylic acid, methacrylic acid, maleic acid, itaconic acid, crotonic acid, fumaric acid, 2-carboxyethyl acrylate, or mixtures thereof. The α, β-ethylenically unsaturated carboxylic acids also includes monomers bearing an acid-forming group which yields or is subsequently convertible to, such an acid group (such as anhydride, (meth)acrylic anhydride, or maleic anhydride); or mixtures thereof. Desirably, the α, β-ethylenically unsaturated carboxylic acid is selected from acrylic acid, methacrylic acid, itaconic acid, 2-carboxyethyl acrylate, or mixtures thereof. The emulsion polymer may comprise structural units of the α, β-ethylenically unsaturated carboxylic acid and salt thereof at a concentration of from zero to 5%, and can be zero or more, 0.3% or more, 0.5% or more, 0.8% or more, 1.0% or more, 1.2% or more, 1.5% or more, 1.8% or more, or even 2% or more, while at the same time is generally at a concentration of 5% or less, and can be 4.5% or less, 4% or less, 3.5% or less, 3.2% or less, 2.8% or less, 3.0% or less, 2.8% or less, 2.5% or less, 2.2% or less, or even 2.0% or less, by weight based on the weight of the emulsion polymer.

The emulsion polymer useful in the present invention may comprise structural units of one or more vinyl aromatic monomer. Suitable vinyl aromatic monomers may include, for example, styrene and substituted styrene such as .alpha.-methyl styrene, p-methyl styrene, t-butyl styrene, trans-beta-methylstyrene, 2,4-dimethylstyrene, ethylstyrene, o-, m-, and p-methoxystyrene; p-trifluoromethylstyrene, or mixtures thereof. Preferably, the vinyl aromatic monomer is styrene. The emulsion polymer may comprise structural units of the vinyl aromatic monomer at a concentration of from 10% to 80%, and can be 10% or more, 20% or more, 30% or more, 35% or more, 40% or more, 45% or more, 50% or more, or even 55% or more, while at the same time is generally at a concentration of 80% or less, and can be 75% or less, 70% or less, 65% or less, or even 60% or less, by weight based on the weight of the emulsion polymer.

The emulsion polymer useful in the present invention may comprise structural units of one or more $C_1$-$C_{24}$-alkyl (meth) acrylate containing alkyl with from 1 to 24 carbon atoms, and can be from 1 to 20 carbon atoms, from 4 to 10, or from 4 to 8 carbon atoms. The alkyl group can be a linear, branched or cyclic alkyl, and preferably, a linear or branched alkyl. Examples of suitable $C_1$-$C_{24}$-alkyl (meth)acrylates include methyl (meth)acrylate, ethyl (meth)acrylate, 2-ethylhexyl (meth)acrylate, butyl (meth)acrylate, tert-butyl (meth)acrylate, lauryl (meth)acrylate, stearyl (meth)methacrylate, dibutyl itaconate, diethyl itaconate, cycloalkyl (meth)acrylates such as cyclohexyl acrylate, cyclohexyl methacrylate, methylcyclohexyl (meth)acrylate, isobornyl methacrylate, isobornyl acrylate, dihydrodicyclopentadienyl (meth)acrylate, trimethylcyclohexyl (meth)acrylate, t-butyl (meth)cyclohexyl acrylate, or mixtures thereof; or combinations thereof. Preferably, the $C_1$-$C_{24}$-alkyl (meth)acrylate is selected from butyl acrylate, 2-ethylhexyl (meth)acrylate, ethyl (meth)acrylate, or mixtures thereof. The total concentration of structural units of the $C_1$-$C_{24}$-alkyl (meth)acrylate may be in a range of from 10% to 70%, and can be 10% or more, 15% or more, 20% or more, 25% or more, 30% or more, 35% or more, or even 40% or more while at the same time is generally at a concentration of 70% or less, and can be 65% or less, 60% or less, 55% or less, 50% or less, 45% or less, or even 40% or less, by weight based on the weight of the emulsion polymer. Desirably, the emulsion polymer may comprise or be free of structural units of the cycloalkyl (meth)acrylate. The concentration of the structural units of the cycloalkyl (meth)acrylate in the emulsion polymer may be in a range of from zero to 5%, and can be less than 5%, less than 4%, less than 3%, less than 2%, less than 1%, or even zero, by weight based on the weight of the emulsion polymer.

The emulsion polymer useful in the present invention may comprise or be free of structural units of one or more monoethylenically unsaturated functional monomer that is other than the monomers described above, having one or more functional groups selected from acetoacetate, acetoacetoxy or acetoacetamide, amide, silane, hydroxyl, ureido, imide, glycidyl, amino, and sulfonic acid; salts thereof; or combinations thereof. These monoethylenically unsaturated functional monomers may include, for example, amino-functional monomers such as dimethylaminoethyl methacrylate, dimethylaminoethyl acrylate, dimethylaminopropyl methacrylate, dimethylaminopropyl acrylate, or mixtures thereof; monomers bearing amide-functional groups such as acrylamide and methacrylamide; monomers bearing glycidyl-functional groups such as glycidyl acrylate, glycidyl methacrylate, or mixtures thereof; vinyltrialkoxysilanes such as vinyltrimethoxysilane, vinyltriethoxysilane, vinyltris(2-methoxyethoxy)silane, vinyldimethylethoxysilane, vinylmethyldiethoxysilane, or mixtures thereof; (meth) acryloxyalkyltrialkoxysilanes such as (meth)acryloxyethyltrimethoxysilane, (meth)acryloxypropyltrimethoxysilane, or mixtures thereof; ureido-functional monomers; hydroxyl-functional monomers such as 2-hydroxyethyl acrylate, 2-hydroxyethyl methacrylate, 2-hydroxypropyl methacrylate, 3-hydroxybutyl methacrylate, or mixtures thereof; acetoacetate functional monomers such as acetoacetoxyethyl (meth) acrylate, acetoacetoxypropyl (meth)acrylate, acetoacetoxybutyl (meth)acrylate, 2,3-di(acetoacetoxy) propyl (meth) acrylate, allyl acetoacetates, vinyl acetoacetates, acetoacetamides, or mixtures thereof; or combinations thereof. As used herein, the term "ureido-functional monomer" refers to an ethylenically unsaturated compound comprising a cyclic ureido group (i.e., an imidazolidin-2-one group). The ureido-functional monomer may include cyclic-ureido-group-containing alkyl esters of (meth)acrylic acids. Examples of suitable ureido-functional monomers include N-(2-methacrylamidoethyl)ethylene urea, N-(2-methacryloyloxyethyl) ethylene urea, N-(maleate diethyl) ethylene urea, or mixtures thereof, and preferably, N-(2-methacryloyloxyethyl) ethylene urea. The sulfonic acid monomers may include sodium vinyl sulfonate (SVS), sodium styrene sulfonate (SSS) and acrylamido-methyl-propane sulfonate (AMPS); salts thereof; or mixtures thereof. The emulsion polymer may comprise structural units of the monoethylenically unsaturated functional monomer at a concentration of zero or more, 0.05% or more, 0.1% or more, 0.2% or more, 0.3% or more, 0.4% or more, or even 0.5% or more, while at the same time is generally at a concentration of 5% or less, and can be 4% or less, 3.5% or less, 3% or less, 2.5% or less, 2% or less, 1.5% or less, 1% or less, 0.8% or less, or even 0.6% or less, by weight based on the weight of the emulsion polymer.

The emulsion polymer useful in the present invention may comprise or be free of structural units of one or more multiethylenically unsaturated monomer. Examples of suitable multiethylenically unsaturated monomer include alkylene glycol diacrylates and dimethacrylates such as ethylene glycol di(meth)acrylate; 1,1,1-trimethylol propane di(meth)acrylate; pentaerythritol trimethacrylate; vinyl (meth)acrylate; divinyl benzene; allyl (meth)acrylate; allyl (meth)acrylamide; allyl oxyethyl (meth)acrylate, crotyl (meth)acrylate, dicyclopentenyl (meth)acrylate, dicyclopentenyl ethyl (meth)acrylate; diallyl maleate; or mixtures thereof. The emulsion polymer may comprise structural units of the multiethylenically unsaturated monomer at a concentration of from zero to 1%, and can be 0.05% or more, 0.1% or more, or even 0.15% or more while at the same time is generally at a concentration of 1% or less, and can be less than 1%, 0.8% or less, 0.5% or less, 0.4% or less, or even 0.3% or less, by weight based on the weight of the emulsion polymer.

The emulsion polymer useful in the present invention may comprise or be free of structural units of one or more monoethylenically unsaturated benzophenone, monoethylenically unsaturated acetophenone, or mixtures thereof. Suitable monoethylenically unsaturated benzophenones may include, for example, vinyl benzophenone, (2-hydroxy-3-methacryloxy) propyl ortho-benzoyl-benzoate, (2-hydroxy-3-acryloxy) propyl ortho-benzoyl-benzoate, or mixtures thereof. The structural units of the monoethylenically unsaturated benzophenone and/or acetophenone may be present at a total concentration of from zero to 3%, and can be zero or more, 0.1% or more, 0.3% or more, 0.5% or more, even 0.7% or more while at the same time is generally at a concentration of 3.0% or less, and can be 2.0% or less, 1.5% or less, 1.2% or less, 1.0% or less, or even 0.9% or less, by weight based on the weight of the emulsion polymer.

The emulsion polymer useful in the present invention may comprise, by weight based on the weight of the emulsion polymer, from 0.8% to 1.2% of structural units of phosphoethyl methacrylate; from 1.1% to 2.1% of structural units of diacetone acrylamide; from 40% to 70% of structural units of styrene; from 20% to 50% of structural units of butyl acrylate, 2-ethylhexyl acrylate, butyl methacrylate, or mixtures thereof; and from 0.3% to 4% of structural units of acrylic acid, methacrylic acid, or mixtures thereof.

Total weight concentration of structural units of the above monomers in the emulsion polymer, based on the weight of the emulsion polymer, can be equal to 100%. Types and levels of the monomers above for preparing the emulsion polymer may be chosen to provide the emulsion polymer with a glass transition temperature ($T_g$) suitable for various applications. The $T_g$ of the emulsion polymer may be −10 degrees Celsius (° C.) or higher, and can be −5° C. or higher, 0° C. or higher, 5° C. or higher, 10° C. or higher, or even 15° C. or higher, while at the same time is generally 40° C. or less, and can be 35° C. or less, 30° C. or less, 25° C. or less, or even 20° C. or less, as calculated by the Fox equation.

Desirably, the emulsion polymer is a multistage emulsion polymer comprising a polymer A and a polymer B. "Multistage emulsion polymer" herein means an emulsion polymer prepared by the sequential addition of two or more different monomer compositions, comprising a polymer A and a polymer B. By "polymer A" and "polymer B" mean these polymers having different compositions and formed in different stages of multistage emulsion polymerization in preparing the multistage emulsion polymer. Each of the stages is sequentially polymerized and different from the immediately proceeding and/or immediately subsequent stage by a difference in monomer composition. Without being bounded by a theory, the multistage emulsion polymer may comprise multiple different phases or layers, which can be demonstrated by scanning transmission electron microscope (STEM) or at least two Tgs as measured by differential scanning calorimetry (DSC). Desirably, the polymer A is the outer layer and the polymer B is the inner layer, of the multistage emulsion polymer. The multistage emulsion polymer may consist of the polymer A and the polymer B. The types and concentrations of structural units of the monomers described above may be chosen to be in the polymer A and/or the polymer B of the multistage emulsion polymer so as to provide the resulting emulsion polymer with the values of Tg just described. Desirably, the polymer A has a Tg of less than 20° C., and can be 17° C. or less, 14° C. or less, 11° C. or less, or even 8° C. or less, while at the same time is generally −20° C. or more, and can be −15° C. or more, −10° C. or more, −5° C. or more, 0° C. or more, 4° C. or more, or even 6° C. or more. The polymer B may have a Tg of higher than 30° C., and can be 35° C. or more, 40° C. or more, 45° C. or more, 49° C. or more, or even 52° C. or more, while at the same time is generally less than 70° C., and can be 65° C. or less, 60° C. or less, 57° C. or less, or even 54° C. or less. The values of Tg are calculated by the Fox equation.

When the emulsion polymer is a multistage emulsion polymer, structural units of the monomers described above in the emulsion polymer section can be present in one of or both of the polymer A and the polymer B at certain concentrations so that a total concentration of structural units of each of the monomers relative to the weight of the multistage emulsion polymer is the same as the concentration of structural units of the same monomer relative to the emulsion polymer described above. For example, one or both of the polymer A and the polymer B in the multistage emulsion polymer comprises structural units of the $C_1$-$C_{24}$-alkyl ester of (meth)acrylic acid. The polymer A and/or the polymer B, and preferably, the polymer A, in the multistage emulsion polymer may comprise or be free of structural units of the α, β-ethylenically unsaturated carboxylic acid.

One or both of the polymer A and the polymer B, and preferably, the polymer A, in the multistage emulsion polymer may comprise structural units of the phosphorous acid monomer, the salt thereof, or mixtures thereof. The polymer A may comprise structural units of the phosphorous acid monomer, the salt thereof, or mixtures thereof at a concentration of from 0.3% to 2.4%, and can be 0.3% or more, 0.5% or more, 0.6% or more, 0.7% or more, 0.8% or more, 0.9% or more, 1.0% or more, 1.1% or more, 1.2% or more, 1.3% or more, 1.4% or more, 1.5% or more, or even 1.6% or more, while at the same time is generally at a concentration of 2.4% or less, and can be 2.3% or less, 2.2% or less, 2.1% or less, 2.0% or less, 1.9% or less, 1.8% or less, or even 1.7% or less, by weight based on the weight of the polymer A. The polymer B may comprise or be free of structural units of the phosphorous acid monomer, the salt thereof, or mixtures thereof, at a concentration of from zero to 2.5%, and can be zero or more, 0.1% or more, 0.2% or more, 0.3% or more, 0.4% or more, or even 0.5% or more, while at the same time is generally at a concentration of 2.5% or less, and can be 2.2% or less, 2.0% or less, 1.8% or less, 1.5% or less, 1.2% or less, 1.0% or less, 0.9% or less, or even 0.6% or less, by weight based on the weight of the polymer B.

One or both of the polymer A and the polymer B, and preferably, the polymer A, in the multistage emulsion polymer may comprise structural units of the diacetone (meth) acrylamide described above. The polymer A may comprise structural units of the diacetone (meth)acrylamide at a concentration of from 0.5% to 6%, and can be 0.5% or more, 0.8% or more, 1.0% or more, 1.2% or more, 1.5% or more, 1.8% or more, 2.0% or more, 2.2% or more, 2.5% or more, 2.8% or more, or even 3% or more, while at the same time is generally at a concentration of 6% or less, and can be 6% or less, 5.5% or less, 5.2% or less, 5% or less, 4.8% or less, 4.5% or less, 4.2% or less, 4% or less, 3.8% or less, 3.6% or less, 3.5% or less, or even 3.2% or less, by weight based on the weight of the polymer A. The polymer B may comprise structural units of the diacetone (meth)acrylamide at a concentration of from zero to 2.5%, and can be 0.1% or more, 0.2% or more, 0.3% or more, 0.4% or more, or even 0.5% or more, while at the same time is generally at a concentration of 2.5% or less, and can be 2.2% or less, 2.0% or less, 1.5% or less, 1.0% or less, or even 0.6% or less, by weight based on the weight of the polymer B.

One or both of the polymer A and the polymer B in the multistage emulsion polymer may comprise structural units of the vinyl aromatic monomer. The polymer A may comprise structural units of the vinyl aromatic monomer at a concentration of from 10% to 75%, and can be 10% or more, 15% or more, 20% or more, 25% or more, 30% or more, 35% or more, 40% or more, 45% or more, or even 50% or more, while at the same time is generally at a concentration of 75% or less, and can be 70% or less, 65% or less, 60% or less, or even 55% or less, by weight based on the weight of the polymer A. The polymer B may comprise structural units of the vinyl aromatic monomer at a concentration of from 10% to 100%, and can be 10% or more, 25% or more, 30% or more, 40% or more, 50% or more, 60% or more, or even 70% or more, while at the same time is generally at a concentration of 100% or less, and can be 95% or less, 90% or less, 85% or less, or even 80% or less, by weight based on the weight of the polymer B.

The polymer A may be present in the multistage emulsion polymer, by weight based on the weight of the multistage emulsion polymer, at a concentration of from 50% to 80%, from 52% to 78%, from 55% to 75%, from 58% to 74%, from 60% to 72%, from 62% to 71%, or from 65% to 70%. The polymer B may be present in the multistage emulsion polymer, by weight based on the weight of the multistage emulsion polymer, at a concentration of from 20% to 50%, from 22% to 48%, from 25% to 45%, from 26% to 42%, from 28% to 40%, from 29% to 38%, or from 30% to 35%. Preferably, the multistage emulsion polymer comprises from 55% to 75% of the polymer A and from 25% to 45% of the polymer B, by weight based on the weight of the multistage emulsion polymer.

Desirably, the multistage emulsion polymer comprises from 50% to 80% of a polymer A and from 20% to 50% of a polymer B, by weight based on the weight of the multistage emulsion polymer,

- wherein the polymer A comprises, by weight based on the weight of the polymer A, from 0.3% to 2.4% of structural units of the phosphorous acid monomer, the salt thereof, or mixtures thereof, from 0.5% to 6% of structural units of the diacetone (meth)acrylamide, from 10% to 75% of structural units of the vinyl aromatic monomer;
- wherein the polymer B comprises, by weight based on the weight of the polymer B, from zero to 2.5% of structural units of the phosphorous acid monomer, the salt thereof, or mixtures thereof, from zero to 2.5% of structural units of the diacetone (meth)acrylamide, and from 10% to 100% of structural units of the vinyl aromatic monomer;
- wherein at least one of the polymer A and polymer B further comprises structural units of the $C_1$-$C_{24}$-alkyl ester of (meth)acrylic acid.

The emulsion polymer useful in the present invention may have a number average molecular weight (Mn) of 5,000 grams per mole (g/mol) or more, 8,000 g/mol or more, 10,000 g/mol or more, 11,000 g/mol or more, 12,000 g/mol or more, 14,000 g/mol or more, 15,000 g/mol or more, 17,000 g/mol or more, 18,000 g/mol or more, 20,000 g/mol or more, 22,000 g/mol or more, 24,000 g/mol or more, or even 26,000 g/mol or more, while at the same time is generally 100,000 g/mol or less, and can be 80,000 g/mol or less, 70,000 g/mol or less, 60,000 g/mol or less, 55,000 g/mol or less, 50,000 g/mol or less, 45,000 g/mol or less, 40,000 g/mol or less, 38,000 g/mol or less, 35,000 g/mol or less, 32,000 g/mol or less, 30,000 g/mol or less, 29,000 g/mol or less, 28,000 g/mol or less, 27,000 g/mol or less, or even 26,000 g/mol or less. Molecular weight of the emulsion polymer may be measured by Gel Permeation Chromatography (GPC) (further details provided under GPC Analysis below).

The emulsion polymer useful in the present invention may be prepared by emulsion polymerization of a monomer mixture comprising the monomers described above. Total concentration of the monomers in the monomer mixture for preparing the emulsion polymer, by weight based on the total weight of the monomer mixture, is equal to 100%. For each monomer, the weight concentration of a monomer in the monomer mixture relative to the total weight of the monomer mixture is the same as the above described weight concentration of structural units of such monomer in the emulsion polymer relative to the weight of the emulsion polymer. The monomer mixture may be added neat or as an emulsion in water; or added in one or more additions or continuously, linearly or nonlinearly, over the reaction period of preparing the emulsion polymer. The monomer mixture may be added neat or as an emulsion in water; or added in one or more additions or continuously, linearly or nonlinearly, over the reaction period of preparing the polymer. Temperature suitable for emulsion polymerization process may be lower than 100° C., and can be in a range of from 10 to 99° C. or from 50 to 90° C. One or more surfactants may be used in preparing the emulsion polymer. The emulsion polymer can be prepared by one stage emulsion polymerization, or a multistage emulsion polymerization process which forms the multistage emulsion polymer. The multistage emulsion polymerization process includes at least two stages are formed sequentially, which usually results in the formation of the multistage emulsion polymer comprising at least the polymer A and the polymer B, optionally the different stages can be formed in different reactors. Desirably, the multistage emulsion polymerization process comprises a stage of preparing the polymer A in an aqueous medium and a stage of preparing the polymer B; both by emulsion polymerization. The process may include a stage of polymerization of a monomer mixture A to form the polymer A and a stage of polymerization of a monomer mixture B to form the polymer B. Desirably, the process for preparing the multistage emulsion polymer includes the stage of polymerization to form the polymer A first, and optionally neutralized the polymer A, subsequent the stage of polymerization to form the polymer B in the presence of the polymer A. The monomer mixtures A and B may each independently include the monomers described above for forming the structural unis of the polymers A and B, respectively. Total concentration of the monomer mixtures for preparing the polymer A and the polymer B relative to total weight of monomers for preparing the multistage emulsion polymer can be equal to 100%, relative to the weight of the multistage emulsion polymer (e.g., the total weight of the polymer A and the polymer B). For each monomer, the concentration of the monomer relative to the total weight of monomers used in preparing a polymer (e.g., polymer A) is substantially the same as the concentration of structural units of such monomer relative to the total weight of such polymer (e.g., polymer A).

One or more radical initiator may be used in the polymerization process. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01% to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the proceeding acids. Metal salts of iron, copper, manganese, silver, platinum, vanadium, nickel, chromium, palladium, or cobalt may be used to catalyze the redox reaction. Chelating agents for the metals may optionally be used.

One or more surfactant may be used in the polymerization process for preparing the emulsion polymer. The surfactant may be added prior to or during the polymerization of the monomers, or combinations thereof. A portion of the surfactant can also be added after the polymerization. Surfactants may be used for at least one stage or all stages of preparing the multistage emulsion polymer. The surfactants may include anionic and/or nonionic emulsifiers. The surfactants can be reactive surfactants such as polymerizable surfactants. Examples of suitable surfactants include alkali metal or ammonium salts of alkyl, aryl, or alkylaryl sulfates, sulfonates or phosphates; alkyl sulfonic acids; sulfosuccinate salts; fatty acids; and ethoxylated alcohols or phenols. Preferably, the alkali metal or ammonium salts of alkyl, aryl, or alkylaryl sulfates surfactant are used. The combined amount of the surfactant used is usually from zero to 10% or from 0.5% to 3%, by weight based on the weight of total monomers (that is, the monomer mixture)) used for preparing the emulsion polymer.

One or more chain transfer agent may be used in the polymerization process to control the molecular weight of the emulsion polymer. Examples of suitable chain transfer agents include 3-mercaptopropionic acid, methyl 3-mercaptopropionate, butyl 3-mercaptopropionate, n-dodecyl mercaptan, n-hexadecanethiol, tert-dodecyl mercaptan, n-octadecanethiol, benzenethiol, azelaic alkyl mercaptan, hydroxy group containing mercaptans such as hydroxyethyl mercaptan, mercaptopropionic acid, and mixtures thereof. The chain transfer agent may be used at a concentration of from zero to 2%, and can be 0.05% or more, 0.1% or more, or even 0.15% or more while at the same time is generally at a concentration of 2% or less, 1.5% or less, 1.0% or less, 0.5% or less, 0.3% or less, 0.25% or less, or even 0.20% or less, by weight based on the total weight of the monomers used for preparing the emulsion polymer.

After completing the polymerization, the obtained aqueous dispersion (i.e., polymer emulsion) may be neutralized by one or more bases as neutralizers to a pH value, for example, at least 5, from 6 to 12, from 7 to 10, or from 8 to 9. The bases may lead to partial or complete neutralization of the ionic or latently ionic groups of the emulsion polymer. Examples of suitable bases include ammonia; alkali metal or alkaline earth metal compounds such as sodium hydroxide, potassium hydroxide, calcium hydroxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The emulsion polymer particles in the aqueous dispersion may have a particle size of 50 nanometers (nm) or more, 80 nm or more, or even 90 nm or more, and at the same time, 500 nm or less, 200 nm or less, or even 150 nm or less. The particle size herein refers to Z-average size and may be measured by a Brookhaven BI-90 Plus Particle Size Analyzer.

The aqueous coating composition of the present invention may comprise the emulsion polymer at a concentration of 10% or more, 15% or more, 20% or more, or even 25% more, while at the same time is generally at a concentration of 80% or less, 70% or less, 60% or less, 50% or less, by weight based on the weight of the aqueous coating composition.

The aqueous coating composition of the present invention may further comprise one or more polyfunctional carboxylic hydrazide containing at least two hydrazide groups per molecule. The polyfunctional carboxylic hydrazide may be selected from adipic dihydrazide, oxalic dihydrazide, isophthalic dihydrazide, polyacrylic polyhydrazides, or mixtures thereof. The polyfunctional carboxylic hydrazide may be present at a concentration of zero or more, and can be 0.05% or more, 0.1% or more, 0.2% or more, 0.4% or more, even 0.6% or more while at the same time is typically at a concentration of 3% or less, and can be 2% or less, 1.5% or less, or even 1% or less, by weight based on the weight of the emulsion polymer.

The aqueous coating composition of the present invention also comprises one or more dicarboxylic acid, a salt thereof, or mixtures thereof, typically in the form of an aqueous solution. "Dicarboxylic acid" refers to a compound containing two carboxyl functional groups (—COOH). The dicarboxylic acid useful in the present invention may have the structure of formula (I):

$$\text{HOOC—R—COOH} \quad \text{(I)}$$

where R is an alkylene, alkenylene, alkynylene, cycloalkylene, cycloalkenylene, cycloalkynylene, arylene, or heterocyclic arylene group; containing 6 to 18 carbon atoms ($C_6$-$C_{18}$). R can contain 6 to 18 carbon atoms, and can have 7 carbon atoms or more, 8 carbon atoms or more, 9 carbon atoms or more, or even 10 carbon atoms or more, while at the same time generally has 18 carbon atoms or less, and can be 17 carbon atoms or less, 16 carbon atoms or less, 15 carbon atoms or less, or even 14 carbon atoms or less. Desirably, the dicarboxylic acid is a linear (i.e., unbranched) or branched aliphatic dicarboxylic acid. Desirably, R is a $C_6$-$C_{18}$ alkylene group (i.e., $—(CH_2)_n—$, where n=6-18), and more preferably, a $C_6$-$C_{14}$ alkylene group. Desirably, the dicarboxylic acid is a saturated dicarboxylic acid. The aqueous coating composition may comprise a mixture of two or more dicarboxylic acids, a mixture of salts of two or more dicarboxylic acids, or combinations thereof.

Suitable dicarboxylic acids may include, for example, sebacic acid ($HOOC(CH_2)_8COOH$), dodecanedioic acid ($HOOC(CH_2)_{10}COOH$), suberic acid ($HOOC(CH_2)_6COOH$), anchoic acid ($HOOC(CH_2)_7COOH$), undecanedioic acid ($HOOC(CH_2)_9COOH$), eicosandioic acid ($HOOC(CH_2)_{18}COOH$), or mixtures thereof, and preferably, sebacic acid.

The aqueous coating composition typically comprises a reaction mixture of at least one dicarboxylic acid (preferably, sebacic acid) with at least one base. The bases useful for neutralizing (i.e., reacting with) the dicarboxylic acid may include those bases described above for neutralizing the aqueous dispersion of the emulsion polymer section, particularly, ammonia, N,N-dimethyl ethanol amine, 2-amino-2-methyl-1-propanol, or mixtures thereof. The base used to neutralize the dicarboxylic acid to form a salt of the dicarboxylic acid (also as "dicarboxylic acid salt") may be in an amount to provide a dry weight ratio of the neutralizer to the dicarboxylic acid in a range of from 30:70 to 70:30, from 35:65 to 65:35, from 40:60 to 60:40, or from 45:55 to 55:45. The aqueous coating composition typically comprise one or more salts of the dicarboxylic acids. Depending on the type of the base used, the resulting salts of dicarboxylic acids can be ammonium salts, alkali metal salts, amine salts, or mixtures thereof. These salts can be mono-neutralized salts of the dicarboxylic acid, bis-neutralized salts of dicarboxylic acid, or mixtures thereof.

The dicarboxylic acid and/or salt thereof may be present in an amount to provide —OOC—R—COO— segments in the aqueous coating composition at a concentration of from 0.28% to 1.0%, and can be 0.28% or more, 0.29% or more, 0.30% or more, 0.35% or more, 0.40% or more, 0.45% or more, 0.50% or more, 0.60% or more, or even 0.70% or more, while at the same time is generally at a concentration of 1.0% or less, and can be 0.9% or less, 0.85% or less, 0.80% or less, or even 0.75% or less, by weight based on the weight of the aqueous coating composition. The —OOC—R—COO— segments may result from the dicarboxylic acid and/or the salts of the dicarboxylic acid. The concentration of the —OOC—R—COO— segments can be determined by liquid chromatography-mass spectrometry (LC-MS), nuclear magnetic resonance (NMR), and/or extraction analyses. Alternatively, the concentration of the —OOC—R—COO— segments can be calculated by the weight of original added, non-neutralized dicarboxylic acid, relative to the weight of the aqueous coating composition. In the case of the aqueous coating composition comprising the salts of a dicarboxylic acid, the weight of the dicarboxylic acid used for forming such salts, instead of the weight of the salts, is used for calculating the concentration of the —OOC—R—COO— segments.

The weight ratio of —OOC—R—COO— segments to the emulsion polymer can be in a range of from 0.008 to 0.08, and can be 0.008 or more, 0.01 or more, 0.011 or more, 0.012 or more, 0.015 or more, or even 0.017 or more, while at the same time is generally 0.08 or less, and can be 0.06 or less, 0.05 or less, 0.04 or less, 0.03 or less, or even 0.02 or less.

The aqueous coating composition of the present invention may comprise one or more flash rust inhibitor. Flash rust inhibitors refer to monoacids, alkalis, and/or salts thereof, which can (i) form a protective thin film with inhibition effect through chemical adsorptions (chemisorption) on the surface of the metal, (ii) form a film by oxide protection of the metal, (iii) react with a potential corrosive component present in aqueous media, forming a complex product, or (iv) act as a hydrophobic film through a process of surface adsorption, providing a barrier to the dissolution of the metal in a corrosion reaction. The flash rust inhibitors may include inorganic flash rust inhibitors, organic flash rust inhibitors, or mixtures thereof. Suitable flash rust inhibitors may include, for example, sodium nitrite, sodium molybdate, sodium chromate, sodium phosphates, sodium phosphites, sodium silicate, phosphoric acid, phosphorous acid, and ions of magnesium, zinc, or nickel (typically in the form of soluble salts of magnesium, zinc, or nickel) that can react with the hydroxyl (—OH) group of water, thus forming insoluble hydroxides (such as $Mg(OH)_2$, $Zn(OH)_2$ or $Ni(OH)_2$) deposited on the cathodic site of metal surface; urea, mercaptobenzothiazole (VIBT), benzotriazole, aldehydes, heterocyclic nitrogen compounds, sulfur-containing compounds, acetylenic compounds, ascorbic acid, benzoic acid, benzoates, caffeine and extracts of natural substances, or mixtures thereof. The concentration of the flash rust inhibitor may be in a range of from 0.05% to 5%, and can be 0.05% or more, 0.06% or more, 0.08% or more, 0.10% or more, 0.12% or more, or even 0.13% or more, while at the same time is generally 5.0% or less, and can be 4.5% or less, 4.0% or less, 3.5% or less, 3.0% or less, 2.5% or less, 2.0% or less, 1.0% or less, 0.9% or less, 0.8% or less, 0.7% or less, 0.6% or less, 0.5% or less, 0.4% or less, 0.3% or less, 0.2% or less, 0.18% or less, or even 0.15% or less, by dry weight based on the weight of the aqueous coating composition.

The aqueous coating composition of the present invention may comprise or be free of one or more pigment. "Pigment" herein refers to a material which is capable of materially contributing to the opacity or hiding capability of a composition. Such material typically has a refractive index greater than 1.8. Inorganic pigments typically include metal oxides. Examples of suitable inorganic pigments include titanium dioxide ($TiO_2$), zinc sulfide, lithopone, carbon black, iron oxide red, iron oxide black, lemon chrome yellow, or mixtures thereof. Organic pigments typically include prussian blue, organic pigment yellow, organic pigment red, anticorrosive pigments, or mixtures thereof. Preferably, the pigment is selected from $TiO_2$, carbon black, or mixtures thereof. The pigment may be present at a total concentration of from zero to 60%, from 10% to 50%, from 15% to 40%, or from 20% to 35%, by weight based on the weight of the aqueous coating composition. The pigment may comprise or be free of anticorrosive pigments. "Anticorrosive pigment" refers to a pigment that can prevent or retard corrosion of steel through chemical reactions or chelate. Suitable anticorrosive pigments may include, for example, zinc phosphate, zinc molybdate, zinc oxide, aluminum tripolyphosphate, zinc phosphate molybdenum, calcium-modified zinc phosphate, organic molecule-modified zinc phosphate, or mixtures thereof. The anticorrosive pigment may be present at a concentration of from zero to 10%, and can be zero or more, 0.5% or more, 1% or more, 2% or more, 3% or more, or even 4% or more, while at the same time is generally at a concentration of 10% or less, and can be 9% or less, 8% or less, 7% or less, or even 6% or less, and can be 5.5% or less, 5% or less, 4.5% or less, 4% or less, 3.5% or less, 3% or less, 2.5% or less, 2% or less, 1.5% or less, 1% or less, or even 0.5% or less, by weight based on the weight of the aqueous coating composition.

The aqueous coating composition of the present invention may comprise or be free of one or more extender. "Extender" herein refers to a particulate inorganic material having a refractive index of less than or equal to 1.8 and greater than 1.3. Examples of suitable extenders include barium sulphate, talc, calcium carbonate, clay, calcium sulfate, aluminum silicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers such as ROPAQUE™ Ultra E available from The Dow Chemical Company (ROPAQUE is a trademark of The Dow Chemical Company), or mixtures thereof. The aqueous coating composition may comprise the extender at a concentration of from zero to 60%, and can be from 10% to 50%, from 15% to 40%, or from 20% to 35%, by weight based on the weight of the aqueous coating composition.

The aqueous coating composition of the present invention may comprise or be free of one or more defoamer. "Defoamer" herein refer to a chemical additive that reduces and hinders the formation of foam. Defoamers may be silicone-based defoamers, mineral oil-based defoamers, ethylene oxide/propylene oxide-based defoamers, alkyl polyacrylates and mixtures thereof. Suitable commercially available defoamers may include, for example, TEGO Airex 901 W, TEGO Airex 902 W and TEGO Foamex 1488 polyether siloxane copolymer emulsions available from TEGO, BYK-022 and BYK-024 silicone deformer available from BYK, and mixtures thereof. The defoamer may be present generally at a concentration of from zero to 0.5%, from 0.02% to 0.4%, or from 0.04% to 0.2%, by weight based on the weight of the aqueous coating composition.

The aqueous coating composition of the present invention may comprise or be free of one or more thickener, also known as "rheology modifier". Thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is HEUR. The thickener may be present at a concentration of from zero to 1.0%, from 0.05% to 0.6%, or from 0.1% to 0.4%, by weight based on the weight of the aqueous coating composition.

The aqueous coating composition of the present invention may comprise or be free of one or more wetting agent. "Wetting agent" herein refer to a chemical additive that reduces the surface tension of a composition, causing the composition to be more easily spread across or penetrate the surface of a substrate. Wetting agents may be polycarboxylates, anionic, zwitterionic, or non-ionic. Suitable commercially available wetting agents may include, for example, SURFYNOL 104 and SURFYNOL TG nonionic wetting agent based on an actacetylenic diol available from Evonik, BYK-190, TEGO-750W and TEGO-755W solution of a high molecular weight block polymer with pigment affinic groups available from BYK and Evonik, respectively, BYK-346 and BYK-349 polyether-modified siloxanes both available from BYK, or mixtures thereof. The wetting agent may be present at a concentration of from zero to 0.6%, from 0.1% to 0.5%, or from 0.2% to 0.4%, by weight based on the weight of the aqueous coating composition.

The aqueous coating composition of the present invention may comprise or be free of one or more coalescent. "Coalescent" herein refer to a slow-evaporating solvent that fuses polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescent may be present at a centration of from zero to 10%, from 0.2% to 8%, or from 1% to 6%, by weight based on the weight of the aqueous coating composition.

The aqueous coating composition of the present invention may comprise or be free of one or more dispersant. Dispersants can be polyacrylic acid or polymethacrylic acid or maleic anhydride with various monomers such as styrene, acrylate or methacrylate esters, diisobutylene, and other hydrophilic or hydrophobic comonomers; salts thereof; or mixtures thereof. The dispersant may be present at a concentration of from zero to 2%, from 0.1% to 1.5%, or from 0.2% to 1%, by weight based on the weight of the aqueous coating composition.

In addition to the components described above, the aqueous coating composition of the present invention may comprise any one or combination of the following additives: buffers, neutralizers, humectants, mildewcides, biocides, anti-skinning agents, colorants, anti-oxidants, plasticizers, leveling agents, adhesion promoters, and grind vehicles. These additives may be present at a total concentration of from zero to 10%, from 0.1% to 5%, or from 0.2% to 1%, by weight based on the weight of the aqueous coating composition. The aqueous coating composition may also comprise water at a concentration of from 30% to 90%, from 40% to 80%, or from 50% to 70%, by weight based on the weight of the aqueous coating composition.

The aqueous coating composition of the present invention can be prepared by admixing the emulsion polymer typically in an aqueous dispersion, and the dicarboxylic acid and/or the salt thereof typically in an aqueous solution with the flash rust inhibitor, and optionally, the polyfunctional carboxylic hydrazide, the pigment and other components described above. Any of the above-mentioned optional components may also be added during or prior to the mixing to form the aqueous coating composition. Components in the aqueous coating composition may be mixed in any order. For example, the emulsion polymer and the dicarboxylic acid and/or the salt thereof (preferably in an aqueous solution) can mix first, prior to mixing with the flash rust inhibitor and other components if present. Alternatively, dicarboxylic acid and/or the salt thereof may be added after the emulsion polymer is mixed with the flash rust inhibitor and other components if present. The pigments and/or extenders are preferably mixed with the dispersant to form a slurry of pigments and/or extender.

The aqueous coating composition of the present invention is particularly suitable for coating applications such as marine protective coatings, general industrial finishes, metal protective coatings, automotive coatings, traffic paints, Exterior Insulation and Finish Systems (EIFS), wood coatings, coil coatings, plastic coatings, can coatings, architectural coatings, and civil engineering coatings. The aqueous coating composition is particularly suitable for metal protective coatings. The aqueous coating composition can be used as a primer, a topcoat, as one-coat direct-to-metal coating, or in combination with other coatings to form multi-layer coatings.

The aqueous coating composition of the present invention can be applied to, and adhered to, various substrates such as wood, metals, particularly ferrous metals such as cast iron, weld seams, and carbon steel, plastics, foams, stones, elastomeric substrates, glass, fabrics, concrete, or cementitious substrates. The aqueous coating composition can be applied to a substrate by incumbent means including brushing, dipping, rolling and spraying. The aqueous coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition has been applied to a substrate, the polymer composition can dry to form a coating film (this is, coating) at temperatures ranging from 0 to 35° C., or at an elevated temperature, for example, from 35 to 60° C.

The aqueous coating composition of the present invention can demonstrate improved flash rust resistance, early water resistance as well as good long-term corrosion resistance—even in the absence of anticorrosive pigments. The present invention also provides a method of improving flash rust resistance and long-term corrosion resistance of a flash rust and corrosion susceptible substrate such as metals, particularly, ferrous metals. The method comprises providing the substrate, applying the aqueous coating composition to the substrate (that is, coating onto the substrate the coating composition), and drying the aqueous coating composition to form a coated substrate. For example, the aqueous coating composition can achieve flash rust resistance with grade “0” when determined at 40° C. and 90% relative humidity (R.H.). This method can also provide coatings with good early water resistance, as indicated by blister ratings of “8M”, and preferably, “8F” or “10”; and rust ratings of “9P” or “9S”, and preferably, “10”. The long-term corrosion resistance is tested after completely drying the coating composition to form a coated substrate, e.g., drying for 7 days at room temperature (20-25° C.). Good long-term corrosion resistance is characterized by a blister rating of “6F” or “M”, and preferably, “8F” or “10”; and rust ratings of “9P” or “9S”, and preferably, “10”, after at least 150 hours of exposure to salt spray test according to ASTM B117-2011. Flash rust resistance, early water resistance, and long-term corrosion resistance properties may be measured according to the test methods described in the Examples section below. The present invention also relates to an article made by the method. The present invention also relates to a process for preparing a coating. The process may comprise applying the aqueous coating composition to a substrate and drying the applied coating composition to form the coating.

EXAMPLES

Some embodiments of the invention will now be described in the following Examples, wherein all parts and percentages are by weight (wt %), where wt % of structural units is relative to the emulsion polymer weight, and wt % of dicarboxylic acid (e.g., sebacic acid or adipic acid) is relative to the aqueous coating composition weight unless otherwise specified. Materials for use in the samples are described herein below. OROTAN, RETAN and ACRYSOL are trademarks of The Dow Chemical Company.

Styrene (ST) is available from Langyuan Chemical Co., Ltd.

Phosphoethyl methacrylate (PEM) is available from Solvay.

2-Ethylhexyl acrylate (2-EHA), butyl acrylate (BA), ACRYSOL™ RM-8W thickener (a nonionic urethane rheology modifier) and OROTAN™ 681 dispersant (a polymethacrylic acid with hydrophobic comonomers) are all available from The Dow Chemical Company.

Methacrylic acid (MAA), acrylic acid (AA), n-Dodecyl mercaptan (n-DDM), aqueous ammonia (25%), sodium nitrite ($NaNO_2$) anti-flash rust additive, sebacic acid, and adipic acid are all available from Sinopharm Chemical Reagent Co., Ltd.

Cyclohexyl methacrylate (CHMA) and DISPONIL™ FES 32 surfactant (“Fes-32”, an alcohol ethoxylate sulphate surfactant) are both available from BASF.

Diacetone acrylamide (DAAM) and adipic dihydrazide (ADH) are both available from Kyowa Hakko Chemical Co., Ltd.

N-(2-Methacryloyloxyethyl) ethylene urea (MEUR), SURFYNOL™ TG nonionic surfactant based on an actacetylenic diol, and TEGO™ Airex 902W defoamer (a polyether siloxane copolymer emulsion) are all available from Evonik Industries.

POLYSTEP™ B-11 surfactant (“B-11”), available from STEPAN, is an alcohol ethoxylate sulphate surfactant.

HITENOL™ AR-1025 surfactant (“AR-1025”), available from DKS Co., Ltd., is a tristyrylphenol ethoxylate sulphate surfactant.

Ti-PURE™ R-706 titanium dioxide is available from DuPont.

TEXANOL™ ester alcohol, available from Eastman Chemical Company, is used as a coalescent.

Polymer emulsions for use as binders in coating composition samples were prepared according to synthesis process described below:

Synthesis of Polymer Emulsion 11 (“E-11”)

Deionized (DI) water (518 grams (g)), Fes-32 surfactant (31%, 71 g), ST (1016 g), BA (694 g), AA (39 g), PEM (6 g), MEUR (50%, 7 g) and n-DDM (5 g) were mixed together to produce a stable monomer emulsion. To DI water (896 g) under a nitrogen (N) atmosphere at 90° C., were added Fes-32 surfactant (31%, 10 g), the monomer emulsion prepared above (59 g) and APS (9 g) in DI water (20 g) followed by DI water (20 g) to form a reaction mixture. The remaining monomer emulsion, ammonium persulphate (APS, 4 g) in DI water (78 g) and ammonia (25%, 9 g) in DI water (78 g) were then added at 86° C. over 240 minutes (min), followed by DI water (30 g). At the end of polymerization, $FeSO_4$ (0.01 g) in DI water (4 g) mixed with ethylenediamine tetracetic acid (EDTA) sodium salt (0.02 g) in DI water (4 g), a solution of t-butyl hydroperoxide (t-BHP, 5.4 g) dissolved in DI water (35 g) and a solution of isoascorbic acid (IAA, 2.0 g) in DI water (35 g) were all added at 60° C. Then ammonia (17 g) in DI water (17 g) was added at 50° C. to obtain an aqueous dispersion.

Synthesis of Polymer Emulsion 05 (“E-05”)

DI water (363 g), Fes-32 surfactant (31%, 49.1 g), ST (711 g), BA (481 g), AA (14.8 g), PEM (22 g), MEUR (50%, 4.9 g) and n-DDM (3.0 g) were mixed together to produce a stable monomer emulsion. To DI water (628 g) under $N_2$ at 90° C., were added Fes-32 surfactant (31%, 6.8 g), the monomer emulsion prepared above (41 g) and APS (6 g) in DI water (20 g) followed by DI water (20 g) to form a reaction mixture. The remaining monomer emulsion, APS (3 g) in DI water (54 g) and ammonia (25%, 6 g) in DI water (54 g) were then added at 86° C. over 240 min followed by DI water (30 g). At the end of polymerization, $FeSO_4$ (0.01 g) in DI water (4 g) mixed with EDTA sodium salt (0.02 g) in DI water (4 g), a solution of t-BHP (3.8 g) dissolved in DI water (35 g) and a solution of IAA (1.4 g) in DI water (35 g) were all added at 60° C. Then ammonia (17 g) in DI water (17 g) was added at 50° C. to obtain an aqueous dispersion.

Synthesis of Polymer Emulsion 61 ("E-61")

DI water (273 g), AR-1025 surfactant (25%, 22 g), ST (372 g), 2-EHA (315 g), CHMA (225 g), MAA (28 g), PEM (21 g), DAAM (24.8), MEUR (50%, 14 g) and n-DDM (1.5 g) were mixed together to produce a stable monomer emulsion. To DI water (674 g) under $N_2$ at 90° C., were added AR-1025 surfactant (25%, 23 g), the monomer emulsion prepared above (60 g) and APS (1.9 g) in DI water (20 g) and ammonia (0.6 g) in DI water (4 g) followed by DI water (20 g) to form a reaction mixture. The remaining monomer emulsion, APS (1.2 g) in DI water (64 g) and ammonia (25%, 4 g) in DI water (64 g) were then added at 88° C. over 120 min followed by DI water (30 g). At the end of polymerization, $FeSO_4$ (0.01 g) in DI water (4 g) mixed with EDTA sodium salt (0.02 g) in DI water (4 g), a solution of t-BHP (3.5 g) dissolved in DI water (45 g) and a solution of IAA (1.4 g) in DI water (45 g) were all added at 60° C., and then ammonia (30 g) in DI water (17 g) was added at 55° C. Then ADH (15 g) in DI water (25 g) was added at 50° C. to obtain an aqueous dispersion.

Synthesis of Polymer Emulsion 66 ("E-66")

A first stage monomer emulsion (ME1) was prepared by mixing DI water (332 g), B-11 surfactant (54%, 18 g), BA (520 g), ST (777 g), PEM (29), MAA (33.5 g), MEUR (50%, 4.8 g) and n-DDM (2.7 g) together to produce a stable monomer emulsion. A second stage monomer emulsion (ME2) was prepared by mixing DI water (142 g), B-11 surfactant (54%, 8 g), BA (223 g), ST (363 g), MEUR (50%, 3 g) and n-DDM (1.2 g) together to produce a stable monomer emulsion.

To a 5-liter, four-necked round bottom flask equipped with a paddle stirrer, a thermocouple, nitrogen inlet, and reflux condenser was added DI water (953 g), and stirring was initiated. The contents of the flask were heated to 90° C. under $N_2$. B-11 surfactant (54%, 4 g), MAA (3 g), the ME1 (98 g) and APS (5.5 g) in DI water (49 g) were added to the flask, followed by a rinse with DI water (25 g). The remaining ME1, APS (1.6 g) in DI water (48 g) and ammonia (25%, 16 g) in DI water (45 g) were then added over 87 min. After completion of the ME1 feed, DI water (22 g) was added as a rinse. ME2 and APS (0.7 g) in DI water (21 g) were then added over 33 min. After completion of the ME2 feed, DI water (30 g) was added as a rinse. The contents of the flask were maintained at 87-89° C. during the additions. At the end of polymerization, a mixture of $FeSO_4.7H_2O$ (0.016 g) in DI water (5 g) and EDTA sodium salt (0.016 g) in DI water (5 g), a solution of t-BHP (70%, 3.7 g t-BHP dissolved in 39 g DI water), and a solution of IAA (2.6 g IAA dissolved in 41 g DI water) were all added to the flask at 60° C. Then ammonia (25%, 28 g) in DI water (28 g) was added to the flask at 50° C. to obtain an aqueous dispersion.

Synthesis of Polymer Emulsion 12 ("E-12")

A first stage monomer emulsion (ME1) was prepared by mixing DI water (313 g), B-11 surfactant (54%, 17 g), BA (478 g), ST (714 g), PEM (28), MAA (32 g), DAAM (32 g), MEUR (50%, 4.5 g) and n-DDM (2.6 g) together to produce a stable monomer emulsion. A second stage monomer emulsion (ME2) was prepared by mixing DI water (134 g), B-11 surfactant (54%, 7 g), BA (210 g), ST (342 g), MEUR (50%, 2 g) and n-DDM (1.0 g) together to produce a stable monomer emulsion.

To a 5-liter, four-necked round bottom flask equipped with a paddle stirrer, a thermocouple, nitrogen inlet, and reflux condenser was added DI water (889 g), and stirring was initiated. The contents of the flask were heated to 90° C. under $N_2$. B-11 surfactant (54%, 4 g), MAA (5.6 g), the ME1 (93 g) and APS (5.2 g) in DI water (46 g) were added to the flask, followed by a rinse with DI water (30 g). The remaining ME1, APS (1.6 g) in DI water (45 g) and ammonia (25%, 15 g) in DI water (43 g) were then added over 87 min. After completion of the ME1 feed, DI water (30 g) was added as a rinse. ME2 and APS (0.7 g) in DI water (20 g) were then added over 33 min. After completion of the ME2 feed, DI water (30 g) was added as a rinse. The contents of the flask were maintained at 87-89° C. during the additions. At the end of polymerization, a mixture of $FeSO_4.7H_2O$ (0.008 g) in DI water (5 g) and EDTA sodium salt (0.016 g) in DI water (5 g), a solution of t-BHP (70%, 3.5 g t-BHP dissolved in 36 g DI water), and a solution of IAA (2.4 g IAA dissolved in 38 g DI water) were all added to the flask at 60° C. Then ammonia (25%, 26 g) in DI water (26 g) and ADH (19 g) in DI water (67 g) were added to the flask at 50° C. to obtain an aqueous dispersion.

Synthesis of Polymer Emulsion 29 ("E-29")

A first stage monomer emulsion (ME1) was prepared by mixing DI water (301 g), B-11 surfactant (54%, 15 g), BA (560 g), ST (572 g), PEM (26), MAA (30 g), DAAM (43 g), MEUR (50%, 4.3 g) and n-DDM (5 g) together to produce a stable monomer emulsion. A second stage monomer emulsion (ME2) was prepared by mixing DI water (130 g), B-11 surfactant (54%, 7.6 g), BA (105 g), ST (425 g), MEUR (50%, 2 g) and n-DDM (1.0 g) together to produce a stable monomer emulsion.

To a 5-liter, four-necked round bottom flask equipped with a paddle stirrer, a thermocouple, nitrogen inlet, and reflux condenser was added DI water (780 g), and stirring was initiated. The contents of the flask were heated to 90° C. under $N_2$. B-11 surfactant (54%, 4.7 g), MAA (5.3 g), the ME1 (89 g) and APS (5 g) in DI water (44 g) were added to the flask, followed by a rinse with DI water (45 g). The remaining ME1, APS (1.5 g) in DI water (71 g) and ammonia (25%, 15 g) in DI water (52 g) were then added over 87 min. After completion of the ME1 feed, DI water (30 g) was added as a rinse. ME2 and APS (0.7 g) in DI water (30 g) were then added over 33 min. After completion of the ME2 feed, DI water (30 g) was added as a rinse. The contents of the flask were maintained at 87-89° C. during the additions. At the end of polymerization, a mixture of $FeSO_4.7H_2O$ (0.008 g) in DI water (5 g) and EDTA sodium salt (0.016 g) in DI water (5 g), a solution of t-BHP (70%, 3.4 g t-BHP dissolved in 43 g DI water), and a solution of IAA (2.3 g IAA dissolved in 78 g DI water) were all added to the flask at 60° C. Then ammonia (25%, 26 g) in DI water (26 g) and ADH (26 g) in DI water (67 g) were added to the flask at 50° C. to obtain an aqueous dispersion.

Synthesis of Polymer Emulsion 30 ("E-30")

A first stage monomer emulsion (ME1) was prepared by mixing DI water (301 g), B-11 surfactant (54%, 15 g), BA (547 g), ST (554 g), PEM (26), MAA (30 g), DAAM (74 g), MEUR (50%, 4.3 g) and n-DDM (5 g) together to produce a stable monomer emulsion. A second stage monomer emulsion (ME2) was prepared by mixing DI water (130 g), B-11 surfactant (54%, 7.6 g), BA (105 g), ST (425 g), MEUR (50%, 2 g) and n-DDM (1.0 g) together to produce a stable monomer emulsion.

To a 5-liter, four-necked round bottom flask equipped with a paddle stirrer, a thermocouple, nitrogen inlet, and reflux condenser was added DI water (780 g), and stirring was initiated. The contents of the flask were heated to 90° C. under $N_2$. B-11 surfactant (54%, 4.7 g), MAA (5.3 g), the ME1 (89 g) and APS (5 g) in DI water (44 g) were added to the flask, followed by a rinse with DI water (45 g). The remaining ME1, APS (1.5 g) in DI water (71 g) and ammonia (25%, 15 g) in DI water (52 g) were then added over 87 min. After completion of the ME1 feed, DI water (30 g) was added as a rinse. ME2 and APS (0.7 g) in DI water (30 g) were then added over 33 min. After completion of the ME2 feed, DI water (30 g) was added as a rinse. The contents of the flask were maintained at 87-89° C. during the additions. At the end of polymerization, a mixture of $FeSO_4.7H_2O$ (0.008 g) in DI water (5 g) and EDTA sodium salt (0.016 g) in DI water (5 g), a solution of t-BHP (70%, 3.4 g t-BHP dissolved in 43 g DI water), and a solution of IAA (2.3 g IAA dissolved in 78 g DI water) were all added to the flask at 60° C. Then ammonia (25%, 26 g) in DI water (26 g) and ADH (45 g) in DI water (115 g) were added to the flask at 50° C. to obtain an aqueous dispersion.

Synthesis of Polymer Emulsion 31 ("E-31")

A first stage monomer emulsion (ME1) was prepared by mixing DI water (301 g), B-11 surfactant (54%, 15 g), BA (570 g), ST (597 g), PEM (26), MAA (30 g), DAAM (9 g), MEUR (50%, 4.3 g) and n-DDM (5 g) together to produce a stable monomer emulsion. A second stage monomer emulsion (ME2) was prepared by mixing DI water (130 g), B-11 surfactant (54%, 7.6 g), BA (105 g), ST (425 g), MEUR (50%, 2 g) and n-DDM (1.0 g) together to produce a stable monomer emulsion.

To a 5-liter, four-necked round bottom flask equipped with a paddle stirrer, a thermocouple, nitrogen inlet, and reflux condenser was added DI water (780 g), and stirring was initiated. The contents of the flask were heated to 90° C. under $N_2$. B-11 surfactant (54%, 4.7 g), MAA (5.3 g), the ME1 (89 g) and APS (5 g) in DI water (44 g) were added to the flask, followed by a rinse with DI water (45 g). The remaining ME1, APS (1.5 g) in DI water (71 g) and ammonia (25%, 15 g) in DI water (52 g) were then added over 87 min. After completion of the ME1 feed, DI water (30 g) was added as a rinse. ME2 and APS (0.7 g) in DI water (30 g) were then added over 33 min. After completion of the ME2 feed, DI water (30 g) was added as a rinse. The contents of the flask were maintained at 87-89° C. during the additions. At the end of polymerization, a mixture of $FeSO_4.7H_2O$ (0.008 g) in DI water (5 g) and EDTA sodium salt (0.016 g) in DI water (5 g), a solution of t-BHP (70%, 3.4 g t-BHP dissolved in 43 g DI water), and a solution of IAA (2.3 g IAA dissolved in 78 g DI water) were all added to the flask at 60° C. Then ammonia (25%, 26 g) in DI water (26 g) and ADH (5.3 g) in DI water (14 g) were added to the flask at 50° C. to obtain an aqueous dispersion.

Synthesis of Polymer Emulsion 32 ("E-32")

A first stage monomer emulsion (ME1) was prepared by mixing DI water (301 g), B-11 surfactant (54%, 15 g), BA (548 g), ST (601 g), PEM (44), MAA (22 g), DAAM (44 g), MEUR (50%, 4.3 g) and n-DDM (5 g) together to produce a stable monomer emulsion. A second stage monomer emulsion (ME2) was prepared by mixing DI water (130 g), B-11 surfactant (54%, 7.6 g), BA (105 g), ST (425 g), MEUR (50%, 2 g) and n-DDM (1.0 g) together to produce a stable monomer emulsion.

To a 5-liter, four-necked round bottom flask equipped with a paddle stirrer, a thermocouple, nitrogen inlet, and reflux condenser was added DI water (780 g), and stirring was initiated. The contents of the flask were heated to 90° C. under $N_2$. B-11 surfactant (54%, 4.7 g), MAA (5.3 g), the ME1 (89 g) and APS (5 g) in DI water (44 g) were added to the flask, followed by a rinse with DI water (45 g). The remaining ME1, APS (1.5 g) in DI water (71 g) and ammonia (25%, 15 g) in DI water (52 g) were then added over 87 min. After completion of the ME1 feed, DI water (30 g) was added as a rinse. ME2 and APS (0.7 g) in DI water (30 g) were then added over 33 min. After completion of the ME2 feed, DI water (30 g) was added as a rinse. The contents of the flask were maintained at 87-89° C. during the additions. At the end of polymerization, a mixture of $FeSO_4.7H_2O$ (0.008 g) in DI water (5 g) and EDTA sodium salt (0.016 g) in DI water (5 g), a solution of t-BHP (70%, 3.4 g t-BHP dissolved in 43 g DI water), and a solution of IAA (2.3 g IAA dissolved in 78 g DI water) were all added to the flask at 60° C. Then ammonia (25%, 26 g) in DI water (26 g) and ADH (11 g) in DI water (28 g) were added to the flask at 50° C. to obtain an aqueous dispersion.

Synthesis of Polymer Emulsion 41 ("E-41")

A first stage monomer emulsion (ME1) was prepared by mixing DI water (301 g), B-11 surfactant (54%, 15 g), BA (560 g), ST (580 g), PEM (35 g), MAA (26 g), DAAM (31 g), MEUR (50%, 4.3 g) and n-DDM (5 g) together to produce a stable monomer emulsion. A second stage monomer emulsion (ME2) was prepared by mixing DI water (130 g), B-11 surfactant (54%, 7.6 g), BA (105 g), ST (425 g), MEUR (50%, 2 g) and n-DDM (1.0 g) together to produce a stable monomer emulsion.

To a 5-liter, four-necked round bottom flask equipped with a paddle stirrer, a thermocouple, nitrogen inlet, and reflux condenser was added DI water (780 g), and stirring was initiated. The contents of the flask were heated to 90° C. under $N_2$. B-11 surfactant (54%, 4.7 g), MAA (5.3 g), the ME1 (89 g) and APS (5 g) in DI water (44 g) were added to the flask, followed by a rinse with DI water (45 g). The remaining ME1, APS (1.5 g) in DI water (71 g) and ammonia (25%, 15 g) in DI water (52 g) were then added over 87 min. After completion of the ME1 feed, DI water (30 g) was added as a rinse. ME2 and APS (0.7 g) in DI water (30 g) were then added over 33 min. After completion of the ME2 feed, DI water (30 g) was added as a rinse. The contents of the flask were maintained at 87-89° C. during the additions. At the end of polymerization, a mixture of $FeSO_4.7H_2O$ (0.008 g) in DI water (5 g) and EDTA sodium salt (0.016 g) in DI water (5 g), a solution of t-BHP (70%, 3.4 g t-BHP dissolved in 43 g DI water), and a solution of IAA (2.3 g IAA dissolved in 78 g DI water) were all added to the flask at 60° C. Then ammonia (25%, 26 g) in DI water (26 g) and ADH (18.5 g) in DI water (48 g) were added to the flask at 50° C. to obtain an aqueous dispersion.

Synthesis of Polymer Emulsion 42 ("E-42")

A first stage monomer emulsion (ME1) was prepared by mixing DI water (301 g), B-11 surfactant (54%, 15 g), BA (564 g), ST (585 g), PEM (18 g), MAA (35 g), DAAM (31 g), MEUR (50%, 4.3 g) and n-DDM (5 g) together to produce a stable monomer emulsion. A second stage monomer emulsion (ME2) was prepared by mixing DI water (130 g), B-11 surfactant (54%, 7.6 g), BA (105 g), ST (425 g), MEUR (50%, 2 g) and n-DDM (1.0 g) together to produce a stable monomer emulsion.

To a 5-liter, four-necked round bottom flask equipped with a paddle stirrer, a thermocouple, nitrogen inlet, and reflux condenser was added DI water (780 g), and stirring was initiated. The contents of the flask were heated to 90° C. under $N_2$. B-11 surfactant (54%, 4.7 g), MAA (5.3 g), the ME1 (89 g) and APS (5 g) in DI water (44 g) were added to the flask, followed by a rinse with DI water (45 g). The remaining ME1, APS (1.5 g) in DI water (71 g) and ammonia (25%, 15 g) in DI water (52 g) were then added over 87 min. After completion of the ME1 feed, DI water (30 g) was added as a rinse. ME2 and APS (0.7 g) in DI water (30 g) were then added over 33 min. After completion of the ME2 feed, DI water (30 g) was added as a rinse. The contents of the flask were maintained at 87-89° C. during the additions. At the end of polymerization, a mixture of $FeSO^4 \cdot 7H_2O$ (0.008 g) in DI water (5 g) and EDTA sodium salt (0.016 g) in DI water (5 g), a solution of t-BHP (70%, 3.4 g t-BHP dissolved in 43 g DI water), and a solution of IAA (2.3 g IAA dissolved in 78 g DI water) were all added to the flask at 60° C. Then ammonia (25%, 26 g) in DI water (26 g) and ADH (18.5 g) in DI water (48 g) were added to the flask at 50° C. to obtain an aqueous dispersion.

The as prepared polymer emulsions were characterized according to the test methods below and properties of these aqueous polymer dispersions are given in Table 1:

Solids Content

Determine solids content of aqueous dispersion samples by weighting 0.7±0.1 g of a sample (wet weight of the sample is denoted as "W1"), putting the sample into an aluminum pan (weight of aluminum pan is denoted as "W2") in an oven at 150° C. for 25 min, and then cooling to room temperature and weighting the aluminum pan with the dried sample with total weight denoted as "W3". "W3−W2" refers to dry or solids weight of the sample. The solids content is calculated by (W3−W2)/W1*100%.

GPC Analysis

Determine number average molecular weight ($M_n$) of emulsion polymers by GPC analysis performed generally by Agilent 1200. A sample was dissolved in tetrahydrofuran (THF)/formic acid (FA) (5%) with a concentration of 2 milligrams per milliliter (mg/mL), stirred for over one hour, stored at room temperature overnight, and then filtered through 0.45 micrometer (μm) polytetrafluoroethylene (PTFE) filter prior to GPC analysis. The GPC analysis was conducted using the following conditions:

Column: One PLgel GUARD column (10 μm, 50 millimeter (mm)×7.5 mm), Two Mixed B columns (7.8 mm×300 mm) in tandem; column temperature: 40° C.; mobile phase: THF/FA (5%); flow rate: 1.0 mL/minute; Injection volume: 100 μL; detector: Agilent Refractive Index detector, 40° C.; and calibration curve: PL Polystyrene I Narrow standards with molecular weights ranging from 2329000 to 580 g/mol, using polynom 3 fitness.

TABLE 1

Properties of Polymer Emulsions

| Polymer Emulsion | Fox Tg, ° C. | pH | Solids content, % | Particle size, nm | Mn, g/mol |
|---|---|---|---|---|---|
| E-11 | 20 | 8.0 | 47.5 | 120 | 12,750 |
| E-05 | 21 | 7.08 | 46.71 | 96 | N.A. |
| E-61 | 14 | 9.39 | 41.73 | 79 | N.A. |
| E-66 | 22 | 9.45 | 48.72 | 136 | N.A. |
| E-12 | 22 | 7.07 | 48.29 | 103 | 19,959 |
| E-31 | 22 | 7.03 | 48.39 | 124 | 15,056 |
| E-32 | 22 | 6.59 | 46.82 | 122 | 21,122 |
| E-29 | 22 | 7.18 | 47.97 | 121 | 18,892 |
| E-30 | 22 | 7.19 | 47.63 | 123 | 25,977 |

TABLE 1-continued

Properties of Polymer Emulsions

| Polymer Emulsion | Fox Tg, ° C. | pH | Solids content, % | Particle size, nm | Mn, g/mol |
|---|---|---|---|---|---|
| E-42 | 22 | 6.99 | 48.48 | 122 | 15,774 |
| E-41 | 22 | 7.02 | 47.84 | 123 | 18,754 |

*Fox Tg was calculated by the Fox equation. Dry $Weight_{(emulsion\ polymer)} = Weight_{(polymer\ emulsion)}$*Solids $Content_{(polymer\ emulsion)}$.

N.A. - not available.

Preparation of Aqueous Solution of Neutralized Sebacic Acid ("Sebacic Acid Solution")

Sebacic acid (6.00 g), aqueous ammonia solution (25%, 19.53 g) and water (1.74 g) were mixed and stirred to give a transparent solution comprising sebacic acid, mono-ammonium sebate, bis-ammonium sebate, or mixtures thereof.

Preparation of Aqueous Solution of Neutralized Adipic Acid ("Adipic Acid Solution")

Adipic acid (6.00 g), aqueous ammonia solution (25%, 19.53 g) and water (1.74 g) were mixed and stirred to give a transparent solution comprising adipic acid, mono-ammonium adipate, bis-ammonium adipate, or mixtures thereof.

Coating Composition Samples

Formulations for direct to metal (DTM) coating samples are in Tables 2 and 3, with the amount of each component reported in grams (g). The as prepared polymer emulsions above were used as binders in the samples and the specific binder used in each sample is given in Table 4. A pigment grind was prepared by mixing the components in the grind stage using a high speed grinder at 1500 revolutions per minute (RPM) for 20 min. The binder was premixed with water and aqueous ammonia solution to adjust a pH value to above 8.5 to obtain a premix. Then the pigment grind was added into the premix, followed by addition of TEXANOL ester alcohol. The resulting mixture was further added the aqueous solution of $NaNO_2$ and the Sebacic Acid Solution or Adipic Acid Solution prepared above. Finally, ACRYSOL RM-8W rheology modifier and water were added to adjust KU viscosities of the resulting samples to 80-90 kreb units (KU) as measured by using a BROOKFIELD™ KU-3 Viscometer at room temperature. The obtained coating composition samples were evaluated according to the following test methods, and properties and characterization results are given in Table 4:

Flash Rust Resistance Test

A cast iron panel (Model QT500-7 according to GB/T 1348-2009) was burnished with 240 grits abrasive paper to remove free rust on the surface of the panel. The surface of the panel was further treated with alcohol to remove anti-flash oil. After that, a coating composition sample (1.5 g) was brushed over a 4 cm×8 cm section of the panel by art brushes (Model 6713 from Shanghai Oil Paint Brush Manufactory, which gave a final dry film thickness of 60 μm to 80 μm. The coated panel was immediately put into an environmental chamber under conditions of 40° C. and 90% R.H. (LabEvent L C/100/40/5) for 24 hours. Then the panel was removed to rate flash rust grades according to ISO 8501-4:2006 as shown in Table A below. Flash rust rating of "0" is acceptable.

TABLE A

| Description of the surface appearance for four flash rust grades | |
|---|---|
| 0 | No flash rust<br>A surface which, when viewed without magnification, exhibits no yellow/brown rust layer or spots. The coating film is uniform with no stains. |
| L | Light flash rust<br>A surface which, when viewed without magnification, exhibits small quantities of a yellow/brown rust layer through which the coating film can be seen. The rust (seen as a discoloration) can be evenly distributed or present in patches, but it will be tightly adherent and not easily removed by gentle wiping with a cloth. |
| M | Medium flash rust<br>A surface which, when viewed without magnification, exhibits a layer of yellow/brown rust that obscures the original coating film. The rust layer can be evenly distributed or present in patches, but it will be reasonably well adherent and it will lightly mark a cloth that is gently wiped over the surface. |
| H | Heavy flash rust<br>A surface which, when viewed without magnification, exhibits a layer of red-yellow/brown rust that obscures the original coating film and is loosely adherent. The rust layer can be evenly distributed or present in patches and it will readily mark a cloth that is gently wiped over the surface. |

Early Water Resistance Test

A coating composition sample was applied onto a cold rolled steel panel (R46 from Q-lab, Inc) by a 150 μm applicator, and then dried at 23° C. and 50% R.H. for 120 min. The resultant coated panels were partially immersed into DI water for 12 days at 23° C. Then the surface of the panels after immersion was observed in terms of rust spots and blisters.

Blister ratings are conducted in accordance to ASTM D714-02 (2009) and comprise a number and/or one or more letters, as shown in Table B. The letter F, M, MD or D is a qualitative representation of the density of blisters. The number refers to the size of the blister, whereby 2 is the largest size, 8 is the smallest size, and 10 is no blister. The bigger the number, the smaller the size of blister. Rust ratings are determined by ASTM D610-2001, as shown in Tables C and D. Panels with blister ratings of "8M", and preferably, "8F" or "10"; and rust ratings of "9P" or "9S", and preferably, "10", are acceptable, indicating good early water resistance.

Long-Term Corrosion Resistance Test

Determine long-term corrosion resistance by exposure of panels to a salt spray environment to a salt spray environment (5% sodium chloride fog) in accordance with ASTM B117-2011 test method (Q-Fog cyclic corrosion tester, model No. Q-FOG/CCT1100).

The panels were prepared by drawing down a coating composition sample on cold rolled steel (R46 from Q-lab, Inc) by a 150 μm applicator and drying at 23° C. and 50% R.H. for 7 days to give a final dry film thickness of 40 μm to 60 μm. Exposed cold rolled steel was covered with tape (3M plastic tape #471) prior to exposure. A scribe mark made with a razor blade was scratched into the bottom half of the panel immediately before exposure. Then panels were exposed to the salt spray environment for 150 hours, and then removed and washed using DI water to rate rust and blistering. Panels with blister ratings of "6F" or "8M", and preferably, "8F" or "10"; and rust ratings of "9P" or "9S", and preferably, "10", are acceptable, indicating good long-term corrosion resistance.

TABLE B

Blister rating criteria

| Density of blister | Abbreviation | Size of Blister | Rating |
|---|---|---|---|
| Few | F | Very Big blister | 2 |
| Medium | M | Big blister | 4 |
| Medium dense | MD | Small to middle blister | 6 |
| Dense | D | Smallest blister seen by unaided eye | 8 |
| | | No blister | 10 |

TABLE C

Rust rating by rusting degree

| Rusting degree | Rating |
|---|---|
| Spots | S |
| General | G |
| Pin point | P |

TABLE D

Rust rating by surface rusted percentage

| Surface rusted | Rating |
|---|---|
| Less than or equal to 0.01 percent | 10 |
| Greater than 0.01 percent and up to 0.03 percent | 9 |
| Greater than 0.03 percent and up to 0.1 percent | 8 |
| Greater than 0.1 percent and up to 0.3 percent | 7 |
| Greater than 0.3 percent and up to 1.0 percent | 6 |
| Greater than 1.0 percent and up to 3.0 percent | 5 |
| Greater than 3.0 percent and up to 10.0 percent | 4 |
| Greater than 10.0 percent and up to 16.0 percent | 3 |
| Greater than 16.0 percent and up to 33.0 percent | 2 |
| Greater than 33.0 percent and up to 50.0 percent | 1 |
| Greater than 50.0 percent | 0 |

Properties and characterization of the coating composition samples are given in Table 4. As shown in Table 4, CEs 1-3 samples used the conventional emulsion polymer as the binder (E-11). CEs 1 and 2 coating composition samples further comprising 0.2 wt % and 0.3 wt % of sebacic acid, respectively, both failed to provide good flash rust resistance. Further increasing the loading of sebacic acid to 0.5 wt % could improve flash rust resistance but resulted in poor long-term corrosion resistance (CE 3). CEs 4-7 samples using E-05 binder without structural units of DAAM provided poor flash rust resistance even with a loading of 0.5 wt % of sebacic acid. CEs 8 and 9 samples comprising E-61 binder with structural units of DAAM but no sebacic acid or with 0.05 wt % of sebacic acid both provided poor flash rust resistance and long-term corrosion resistance. CEs 10 and 11 samples indicate that flash rust resistance was poor in the absence of DAAM-containing binders, or even poor early water resistance, whatever sebacic acid loadings were employed. CEs 12-14 samples comprising E-12 binders with structural units of both DAAM and PEM, where CE 12 sample containing no sebacic acid gave poor flash rust resistance and early water resistance properties, CE 13 sample containing 0.25 wt % of sebacic acid provided poor flash rust resistance, and CE 14 sample comprising 1.5 wt % of sebacic acid provided poor long-term corrosion resistance and early water resistance properties. CE 15 sample comprising E-32 binder with 1.5 wt % of structural units of PEM showed poor early water resistance. CE 16 comprising E-30 binder comprising 4.2 wt % of structural units of DAAM showed poor early water resistance and long-term corrosion resistance. CE 17 sample comprising certain amounts of adipic acid provided flash rust grade of "L", indicating poor flash rust resistance.

In contrast, IEs 1-12 samples all achieved excellent flash rust resistance as well as good early water resistance and long-term corrosion resistance properties, by using the novel combination of the emulsion polymer containing specific concentrations of structural units of PEM and DAAM, with a specific wt % of sebacic acid. In such novel combination, sebacic acid not only contributed to improvement on flash rust resistance, but also exhibited benefits on early water resistance, as compared to CE 12 sample. It indicates synergy effects between the emulsion polymers comprising structural units of both PEM and DAAM, and sebacic acid in improving the properties above.

TABLE 4

Properties and characterization of coating composition samples

| Samples | Binder | Wt % Dicarboxylic Acid | Flash rust grade | Early Water Resistance | Long-term corrosion resistance |
|---|---|---|---|---|---|
| CE 1 | E-11 | 0.2 | H | N.A. | 8M/9S |
| CE 2 | E-11 | 0.3 | L | N.A. | 8M/7S |
| CE 3 | E-11 | 0.5 | 0 | N.A. | 6MD/3G |
| CE 4 | E-05 | 0 | H | N.A. | 6MD/5G |
| CE 5 | E-05 | 0.05 | H | N.A. | 8M/7S |
| CE 6 | E-05 | 0.3 | M | N.A. | N.A. |
| CE 7 | E-05 | 0.5 | M | N.A. | N.A. |

TABLE 4-continued

Properties and characterization of coating composition samples

| Samples | Binder | Wt % Dicarboxylic Acid | Flash rust grade | Early Water Resistance | Long-term corrosion resistance |
|---|---|---|---|---|---|
| CE 8 | E-61 | 0 | H | N.A. | 4D/5S |
| CE 9 | E-61 | 0.05 | H | N.A. | 4MD/7S |
| CE 10 | E-66 | 0.3 | H | 6M/10 | 8M/9P |
| CE 11 | E-66 | 0.5 | H | N.A. | N.A. |
| CE 12 | E-12 | 0 | H | 8MD/10 | N.A. |
| CE 13 | E-12 | 0.25 | L | N.A. | N.A. |
| IE 1 | E-12 | 0.28 | 0 | 10/10 | 8F/9P |
| IE 2 | E-12 | 0.3 | 0 | 10/10 | 8F/9P |
| IE 3 | E-12 | 0.5 | 0 | 10/10 | 8F/9P |
| IE 4 | E-12 | 1 | 0 | 8F/10 | 8F/9P |
| CE 14 | E-12 | 1.5 | 0 | 4MD/7S | 4MD/7S |
| IE 5 | E-31 | 0.3 | 0 | 8M/9P | 8F/10 |
| IE 6 | E-31 | 0.5 | 0 | 8M/9P | 8M/10 |
| CE 15 | E-32 | 0.3 | 0 | 4MD/5S | 6F/9S |
| IE 7 | E-29 | 0.3 | 0 | 10/10 | 8M/9P |
| IE 8 | E-29 | 0.5 | 0 | 10/10 | 8M/9P |
| CE 16 | E-30 | 0.3 | 0 | 2D/5G | 2MD/7S |
| IE 9 | E-42 | 0.3 | 0 | 8F/10 | 6F/9P |
| IE 10 | E-42 | 0.5 | 0 | 10/9P | 8F/9P |
| IE 11 | E-41 | 0.3 | 0 | 8M/9P | 6F/10 |
| IE 12 | E-41 | 0.5 | 0 | 8F/9S | 8M/10 |
| CE 17 | E-12 | 0.3 | L | 10/10 | 8F/10 |

"Wt % Dicarboxylic Acid" refers to "wt % of sebacic acid" for IEs 1-12 and CEs 1-16, calculated by the weight of originally added sebacic acid (raw material) in forming Sebacic Acid Solutions used in preparing the samples relative to the coating composition sample weight; or "wt % of adipic acid" for CE 17, calculated by the weight of originally added adipic acid (raw material) in forming Adipic Acid Solution used in preparing the sample relative to the coating composition sample weight.

TABLE 2

Coating Composition Samples IEs 1-12

| Component | IE 1 | IE 2 | IE 3 | IE 4 | IE 5 | IE 6 | IE 7 | IE 8 | IE 9 | IE 10 | IE 11 | IE 12 |
|---|---|---|---|---|---|---|---|---|---|---|---|---|
| Grind | | | | | | | | | | | | |
| Water | 42 | 42 | 42 | 42 | 42 | 42 | 42 | 42 | 42 | 42 | 42 | 42 |
| OROTAN 681 | 7.8 | 7.8 | 7.8 | 7.8 | 7.8 | 7.8 | 7.8 | 7.8 | 7.8 | 7.8 | 7.8 | 7.8 |
| SURFYNOL TG | 2 | 2 | 2 | 2 | 2 | 2 | 2 | 2 | 2 | 2 | 2 | 2 |
| Aqueous ammonia (28%) | 2 | 2 | 2 | 2 | 2 | 2 | 2 | 2 | 2 | 2 | 2 | 2 |
| TEGO Airex 902W | 0.46 | 0.46 | 0.46 | 0.46 | 0.46 | 0.46 | 0.46 | 0.46 | 0.46 | 0.46 | 0.46 | 0.46 |
| Ti-PURE R-706 | 209.24 | 209.24 | 209.24 | 209.24 | 209.24 | 209.24 | 209.24 | 209.24 | 209.24 | 209.24 | 209.24 | 209.24 |
| Water | 42 | 42 | 42 | 42 | 42 | 42 | 42 | 42 | 42 | 42 | 42 | 42 |
| Letdown | | | | | | | | | | | | |
| Premix | | | | | | | | | | | | |
| Binder (as given in Table 4) | 527.23 | 527.23 | 527.23 | 527.23 | 526.14 | 526.14 | 530.75 | 530.75 | 525.17 | 525.17 | 532.19 | 532.19 |
| Water | 50 | 50 | 50 | 40 | 50 | 50 | 50 | 50 | 50 | 50 | 50 | 50 |
| Aqueous ammonia (28%) | 4 | 4 | 4 | 4 | 4 | 4 | 4 | 4 | 4 | 4 | 4 | 4 |
| End of premix | | | | | | | | | | | | |
| Aqueous solution of $NaNO_2$ (15%) | 9 | 9 | 9 | 9 | 9 | 9 | 9 | 9 | 9 | 9 | 9 | 9 |
| Sebacic Acid Solution (22%) | 12.73 | 13.64 | 22.73 | 45.45 | 13.64 | 22.73 | 13.64 | 22.73 | 13.64 | 22.73 | 13.64 | 22.73 |
| ACRYSOL RM-8W | 2 | 2 | 2 | 2 | 2 | 2 | 2 | 2 | 2 | 2 | 2 | 2 |
| TEXANOL ester alcohol | 52.19 | 52.19 | 52.19 | 52.19 | 53.47 | 53.47 | 53.47 | 53.47 | 50.92 | 50.92 | 50.92 | 50.92 |
| Water | 37.35 | 36.44 | 27.35 | 14.63 | 36.25 | 27.16 | 31.64 | 22.55 | 39.77 | 30.68 | 32.75 | 23.66 |

TABLE 3

Coating Composition Samples CEs 1-17

| Component | CE 1 | CE 2 | CE 3 | CE 4 | CE 5 | CE 6 | CE 7 | CE 8 | CE 9 |
|---|---|---|---|---|---|---|---|---|---|
| Grind | | | | | | | | | |
| Water | 42 | 42 | 42 | 42 | 42 | 42 | 42 | 42 | 42 |
| OROTAN 681 | 7.8 | 7.8 | 7.8 | 7.8 | 7.8 | 7.8 | 7.8 | 7.8 | 7.8 |
| SURFYNOL TG | 2 | 2 | 2 | 2 | 2 | 2 | 2 | 2 | 2 |
| Aqueous ammonia (28%) | 2 | 2 | 2 | 2 | 2 | 2 | 2 | 2 | 2 |
| TEGO Airex 902W | 0.46 | 0.46 | 0.46 | 0.46 | 0.46 | 0.46 | 0.46 | 0.46 | 0.46 |
| Ti-PURE R-706 | 209.24 | 209.24 | 209.24 | 209.24 | 209.24 | 209.24 | 209.24 | 209.24 | 209.24 |
| Water | 42 | 42 | 42 | 42 | 42 | 42 | 42 | 42 | 42 |
| Letdown | | | | | | | | | |
| Binder (given in Table 4) | 536 | 536 | 536 | 545.07 | 545.07 | 545.07 | 545.07 | 610.11 | 610.11 |
| Water | 50 | 50 | 50 | 50 | 50 | 50 | 50 | 10 | 10 |
| Aqueous ammonia (28%) | 4 | 4 | 4 | 4 | 4 | 4 | 4 | 4 | 4 |
| Aqueous solution of $NaNO_2$ (15%) | 9 | 9 | 9 | 9 | 9 | 9 | 9 | 9 | 9 |
| Sebacic Acid Solution (22%) | 9.09 | 13.64 | 22.73 | 0 | 2.27 | 13.64 | 22.73 | 0 | 2.27 |
| ACRYSOL RM-8W | 2 | 2 | 2 | 2 | 2 | 2 | 2 | 2 | 2 |
| TEXANOL ester alcohol | 45.48 | 45.48 | 45.48 | 48.37 | 48.37 | 48.37 | 48.37 | 47.1 | 47.1 |
| Water | 38.93 | 34.38 | 25.29 | 36.06 | 33.79 | 22.42 | 13.33 | 12.29 | 10.02 |

| Component | CE 10 | CE 11 | CE 12 | CE 13 | CE 14 | CE 15 | CE 16 | CE 17 |
|---|---|---|---|---|---|---|---|---|
| Grind | | | | | | | | |
| Water | 42 | 42 | 42 | 42 | 42 | 42 | 42 | 42 |
| OROTAN 681 | 7.8 | 7.8 | 7.8 | 7.8 | 7.8 | 7.8 | 7.8 | 7.8 |
| SURFYNOL TG | 2 | 2 | 2 | 2 | 2 | 2 | 2 | 2 |
| Aqueous ammonia (28%) | 2 | 2 | 2 | 2 | 2 | 2 | 2 | 2 |
| TEGO Airex 902W | 0.46 | 0.46 | 0.46 | 0.46 | 0.46 | 0.46 | 0.46 | 0.46 |
| Ti-PURE R-706 | 209.24 | 209.24 | 209.24 | 209.24 | 209.24 | 209.24 | 209.24 | 209.24 |
| Water | 42 | 42 | 42 | 42 | 42 | 42 | 42 | 42 |
| Letdown | | | | | | | | |
| Binder (given in Table 4) | 522.58 | 522.58 | 527.23 | 527.23 | 527.23 | 543.78 | 534.54 | 527.23 |
| Water | 50 | 50 | 50 | 50 | 20 | 50 | 50 | 50 |
| Aqueous ammonia (28%) | 4 | 4 | 4 | 4 | 4 | 4 | 4 | 4 |
| Aqueous solution of $NaNO_2$ (15%) | 9 | 9 | 9 | 9 | 9 | 9 | 9 | 9 |
| Sebacic Acid Solution (22%) | 13.64 | 22.73 | 0 | 11.36 | 68.18 | 13.64 | 13.64 | 13.64 * |
| ACRYSOL RM-8W | 2 | 2 | 2 | 2 | 2 | 2 | 2 | 2 |
| TEXANOL ester alcohol | 48.37 | 48.37 | 52.19 | 52.19 | 52.19 | 53.47 | 53.47 | 52.19 |
| Water | 44.91 | 35.82 | 50.08 | 38.72 | 11.9 | 18.61 | 27.85 | 36.44 |

* The as prepared Adipic Acid Solution, instead of the Sebacic Acid Solution, was used in CE 17.

The invention claimed is:

1. An aqueous coating composition comprising, (A) an emulsion polymer comprising, based on the weight of the emulsion polymer, from 0.48% to 1.20% by weight of structural units of a dihydrogen phosphate ester of an alcohol in which the alcohol contains or is substituted with a polymerizable vinyl or olefinic group, a salt thereof, or mixtures thereof, from 0.5% to 3% by weight of structural units of diacetone (meth)acrylamide, from 10% to 80% by weight of structural units of a vinyl aromatic monomer, structural units of a $C_1$-$C_{24}$-alkyl ester of (meth)acrylic acids, and optionally, structural units of an α, β-ethylenically unsaturated carboxylic acid, a salt thereof, or mixtures thereof;

(B) a dicarboxylic acid, a salt thereof, or mixtures thereof; wherein the dicarboxylic acid has the structure of formula (I):

HOOC—R—COOH (I)

where R is alkylene, alkenylene, alkynylene, cycloalkylene, cycloalkenylene, cycloalkynylene, arylene, or heterocyclic arylene; containing 6 to 18 carbon atoms;

wherein the dicarboxylic acid, the salt thereof, or mixtures thereof are present in an amount to provide —OOC—R—COO— segments at a concentration of from 0.28% to 1.0% by weight, based on the weight of the aqueous coating composition; and (C) from 0.05% to 5% by weight of a flash rust inhibitor, based on the weight of the aqueous coating composition, wherein the emulsion polymer is a multistage emulsion polymer comprising from 50% to 80% by weight of a polymer A and from 20% to 50% by weight of a polymer B, based on the weight of the multistage emulsion polymer, wherein the polymer A comprises, based on the weight of the polymer A, from 0.3% to 2.4% by weight of structural units of the phosphorous acid monomer, the salt thereof, or mixtures thereof; from 0.5% to 6% by weight of structural units of the diacetone (meth) acrylamide; and from 10% to 75% by weight of structural units of the vinyl aromatic monomer;

wherein the polymer B comprises, based on the weight of the polymer B, from zero to 2.5% by weight of structural units of the phosphorous acid monomer, the salt thereof, or mixtures thereof; from zero to 2.5% by weight of structural units of the diacetone (meth) acrylamide; and from 10% to 100% by weight of structural units of the vinyl aromatic monomer;

wherein at least one of the polymer A and polymer B further comprises structural units of the $C_1$-$C_{24}$-alkyl ester of (meth)acrylic acid.

2. The aqueous coating composition of claim 1, wherein the dicarboxylic acid is selected from sebacic acid, dodecanedioic acid, suberic acid, anchoic acid, undecanedioic acid, eicosandioic acid, or mixtures thereof.

3. The aqueous coating composition of claim 1, wherein the salt of the dicarboxylic acid is an ammonium salt, an alkali metal salt, an amine salt, or mixtures thereof.

4. The aqueous coating composition of claim 1, wherein the dihydrogen phosphate ester of an alcohol in which the alcohol contains or is substituted with a polymerizable vinyl or olefinic group is selected from phosphoethyl methacrylate, phosphoethyl acrylate, allyl ether phosphate, phosphopropyl methacrylate, phosphobutyl methacrylate, or mixtures thereof.

5. The aqueous coating composition of claim 1, wherein the vinyl aromatic monomer is styrene.

6. The aqueous coating composition of claim 1, wherein the emulsion polymer comprises, based on the weight of the emulsion polymer, from 0.3% to 5% by weight of structural units of the α, β-ethylenically unsaturated carboxylic acid, the salt thereof, or mixtures thereof.

7. The aqueous coating composition of claim 1, wherein the emulsion polymer has a glass transition temperature of from −10° C. to 40° C. as calculated by a Fox equation.

8. The aqueous coating composition of claim 1, wherein the emulsion polymer comprises from zero to less than 5% by weight of structural units of a cycloalkyl (meth)acrylate.

9. The aqueous coating composition of claim 1, wherein the emulsion polymer comprises, based on the weight of the emulsion polymer, from 0.8% to 1.2% by weight of structural units of phosphoethyl methacrylate; from 1.1% to 2.1% by weight of structural units of diacetone acrylamide; from 0.3% to 4% by weight of structural units of acrylic acid, methacrylic acid, or mixtures thereof; from 40% to 70% by weight of structural units of styrene; and from 20% to 50% by weight of structural units of butyl acrylate, 2-ethylhexyl acrylate, butyl methacrylate, or mixtures thereof.

10. The aqueous coating composition of claim 1, wherein the emulsion polymer has a number average molecular weight of from 10,000 to 60,000 g/mol as measured by gel permeation chromatography.

11. The aqueous coating composition of claim 1, further comprising a polyfunctional carboxylic hydrazide containing at least two hydrazide groups per molecule.

12. The aqueous coating composition of claim 11, wherein the polyfunctional carboxylic hydrazide is selected from adipic dihydrazide, oxalic dihydrazide, isophthalic dihydrazide, polyacrylic polyhydrazides, or mixtures thereof.

13. The aqueous coating composition of claim 1 wherein the flash rust inhibitor is a monoacid, an alkali, or a salt thereof.

14. A method of preparing the aqueous coating composition of claim 1, comprising admixing the emulsion polymer, and the dicarboxylic acid, the salt thereof, or mixtures thereof, with the flash rush inhibitor.

* * * * *